(12) United States Patent
Nakamura

(10) Patent No.: US 7,090,537 B1
(45) Date of Patent: Aug. 15, 2006

(54) CONNECTOR IN WHICH EVEN A NARROW CARD IS SMOOTHLY GUIDED TO A CONNECTING POSITION

(75) Inventor: Keisuke Nakamura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/214,296

(22) Filed: Aug. 29, 2005

(30) Foreign Application Priority Data

Feb. 17, 2005 (JP) ............................. 2005-041003

(51) Int. Cl.
*H01R 13/692* (2006.01)
(52) U.S. Cl. ....................................... 439/630; 439/923
(58) Field of Classification Search ................ 439/152, 439/159, 160, 923, 630
See application file for complete search history.

(56) References Cited

U.S. PATENT DOCUMENTS

| | | | | |
|---|---|---|---|---|
| 6,045,377 | A * | 4/2000 | Kajiura | 439/159 |
| 6,953,369 | B1 * | 10/2005 | Sasaki et al. | 439/680 |
| 6,966,786 | B1 * | 11/2005 | Motojima et al. | 439/159 |
| 2001/0036759 | A1 * | 11/2001 | Ikemoto et al. | 439/159 |
| 2005/0079767 | A1 * | 4/2005 | Ho et al. | 439/630 |
| 2005/0085114 | A1 * | 4/2005 | Su et al. | 439/159 |
| 2005/0136712 | A1 * | 6/2005 | Katayanagi et al. | 439/139 |
| 2005/0287855 | A1 * | 12/2005 | Taguchi | 439/159 |

FOREIGN PATENT DOCUMENTS

| | | |
|---|---|---|
| JP | 3-70672 | 7/1991 |
| JP | 4-12064 | 1/1992 |
| JP | 2004-151991 | 5/2004 |
| JP | 2004-318511 | 11/2004 |

* cited by examiner

*Primary Examiner*—James R. Harvey
(74) *Attorney, Agent, or Firm*—Collard & Roe, P.C.

(57) ABSTRACT

In a connector adapted to be selectively connected to two types of cards inserted towards an insertion direction and different from each other in width thereof, a housing defines a guide space and has a guide portion for guiding an insertion of a selected one of the cards. The guide portion extends in the guide space in a particular direction intersecting the insertion direction. An eject mechanism is provided for moving the selected one towards a removing direction opposite to the first direction. The eject mechanism includes an eject member to be engaged with the selected one and moved together with the selected one, an operating member for moving the eject member towards the removing direction, and a rotary member having a rotation center and rotatable around the rotation center to transmit operation of the operating member to the eject member. The rotation center is disposed in the guide space.

11 Claims, 25 Drawing Sheets

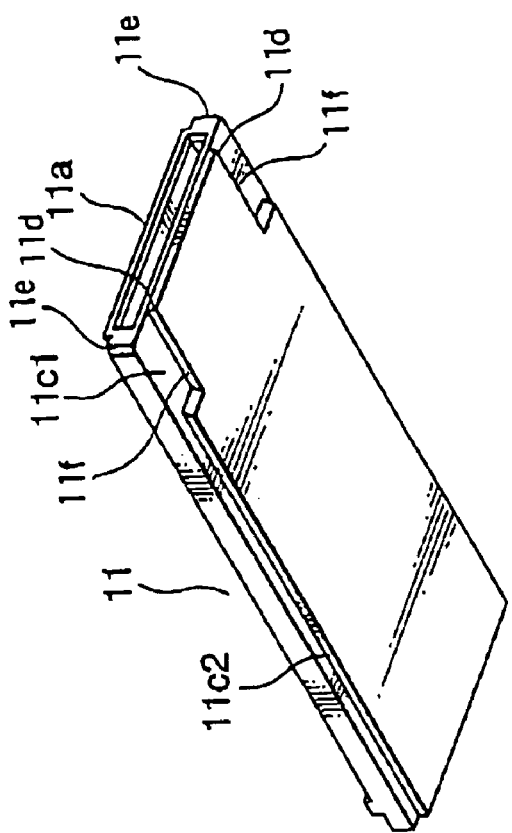
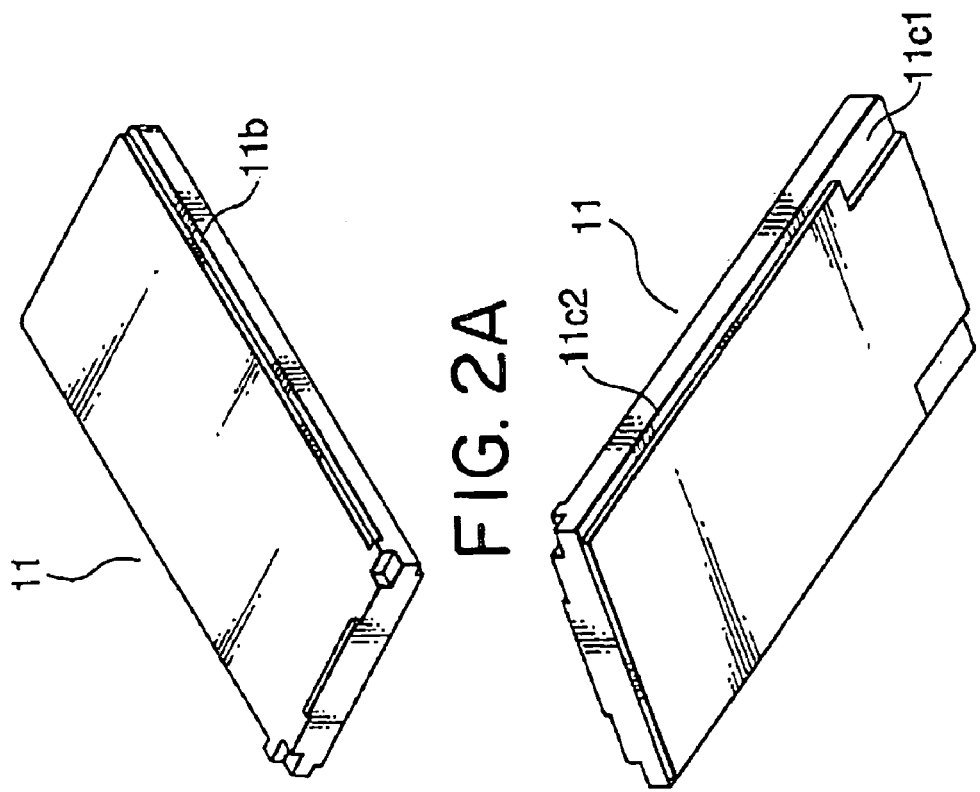
FIG. 2A  FIG. 2B  FIG. 2C

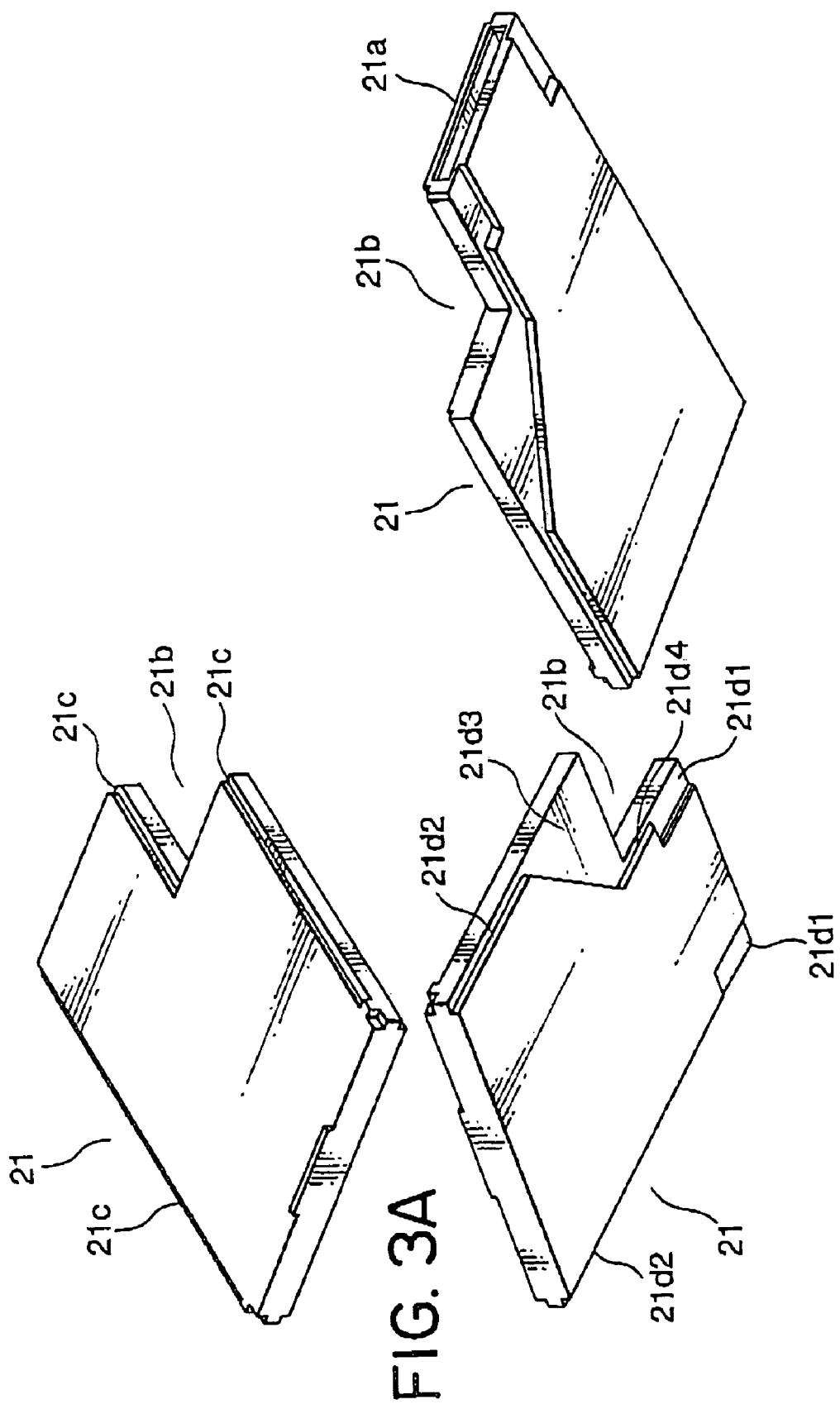

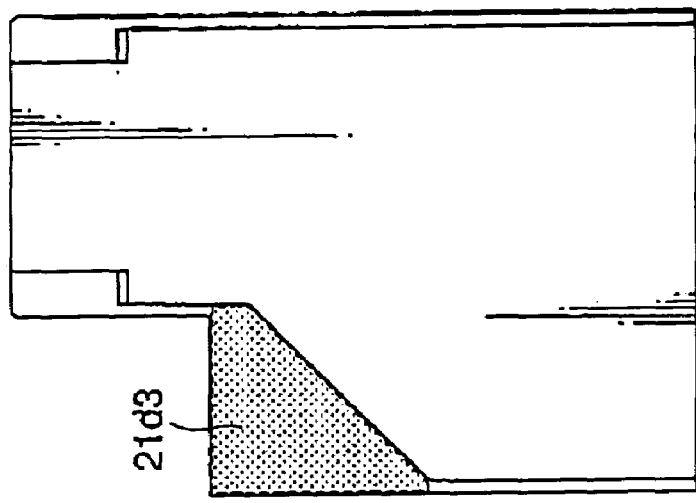
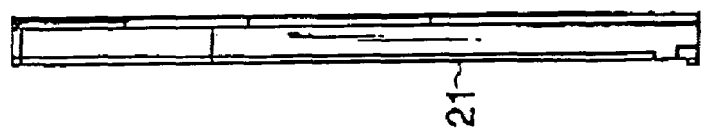
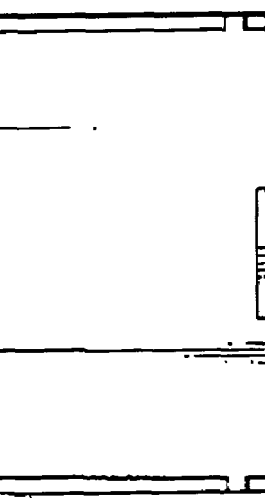
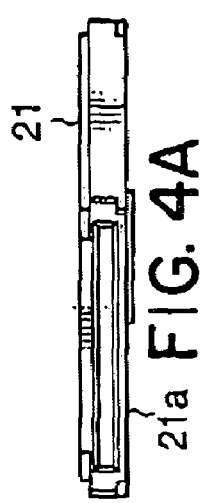
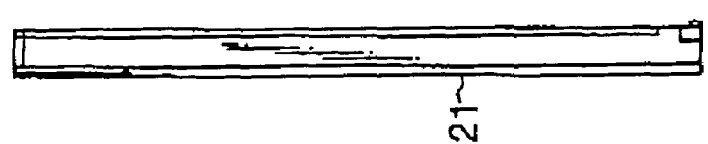

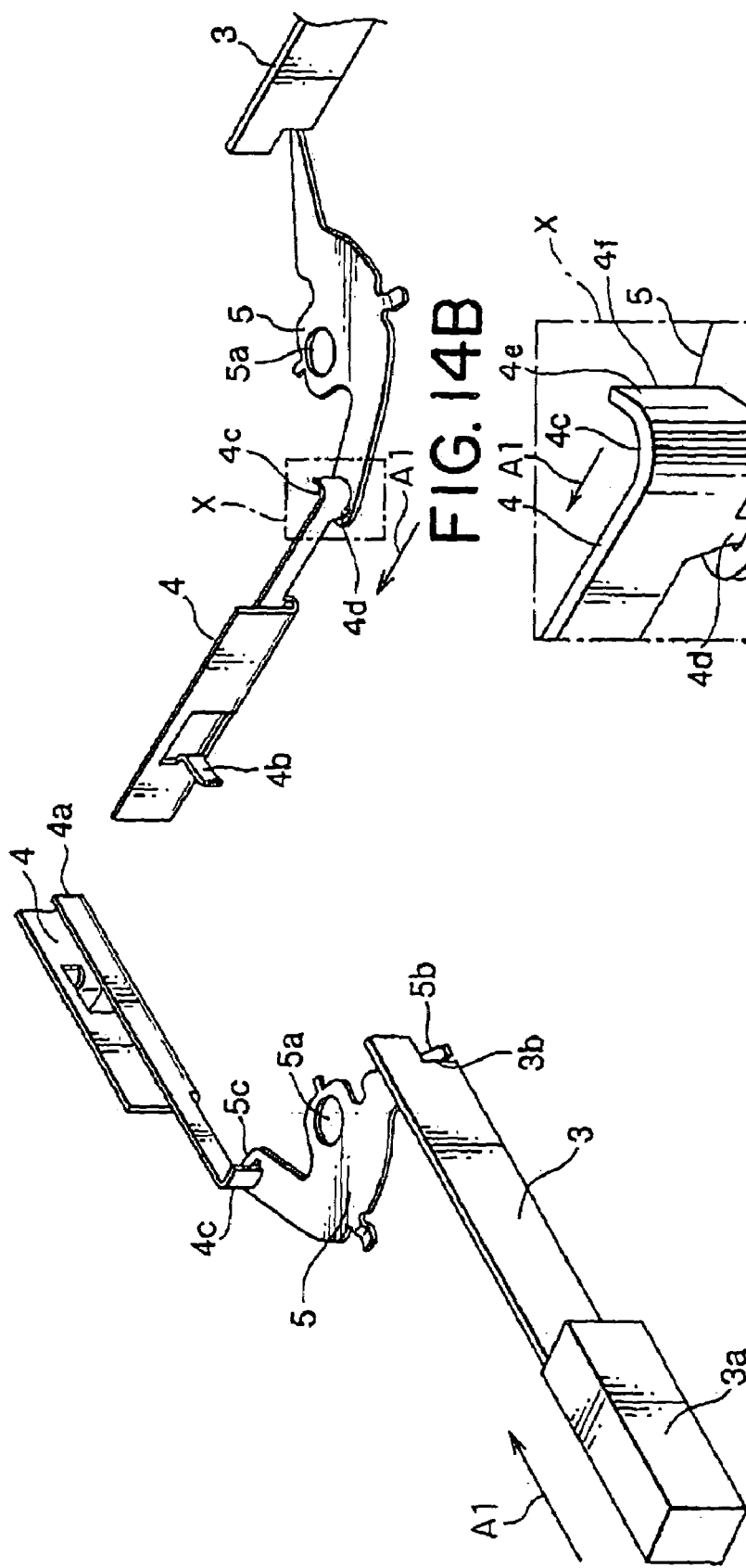
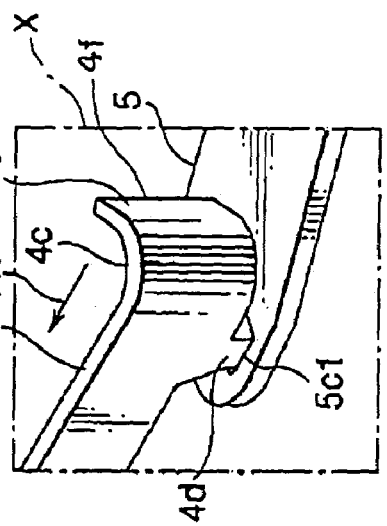
FIG. 14A
FIG. 14B
FIG. 14C

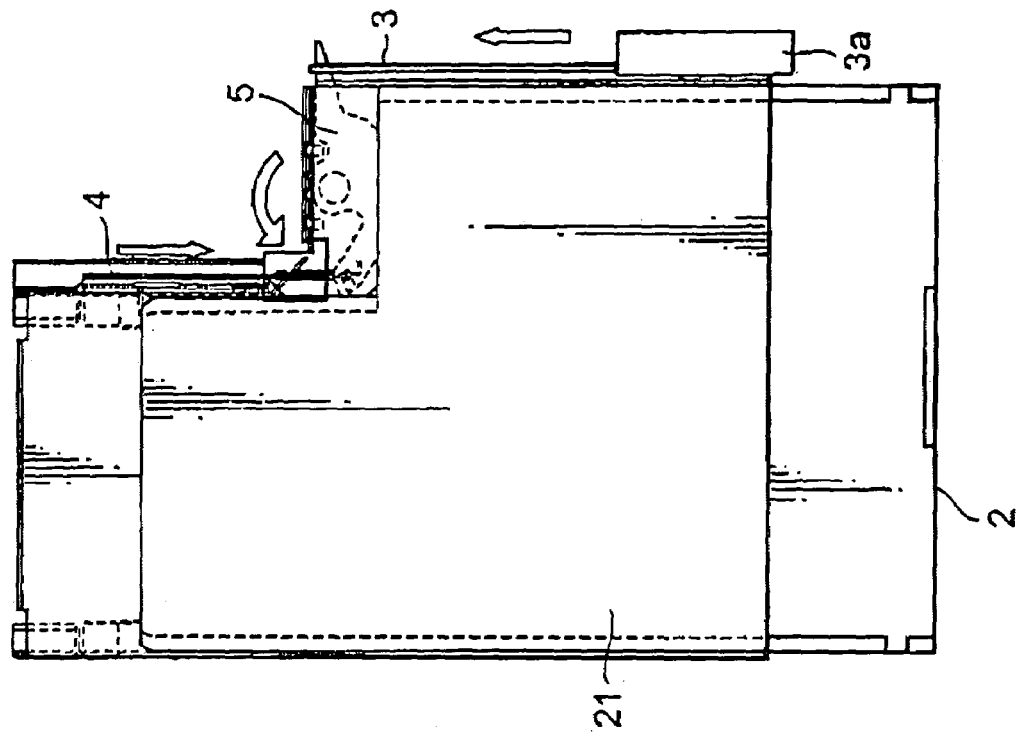
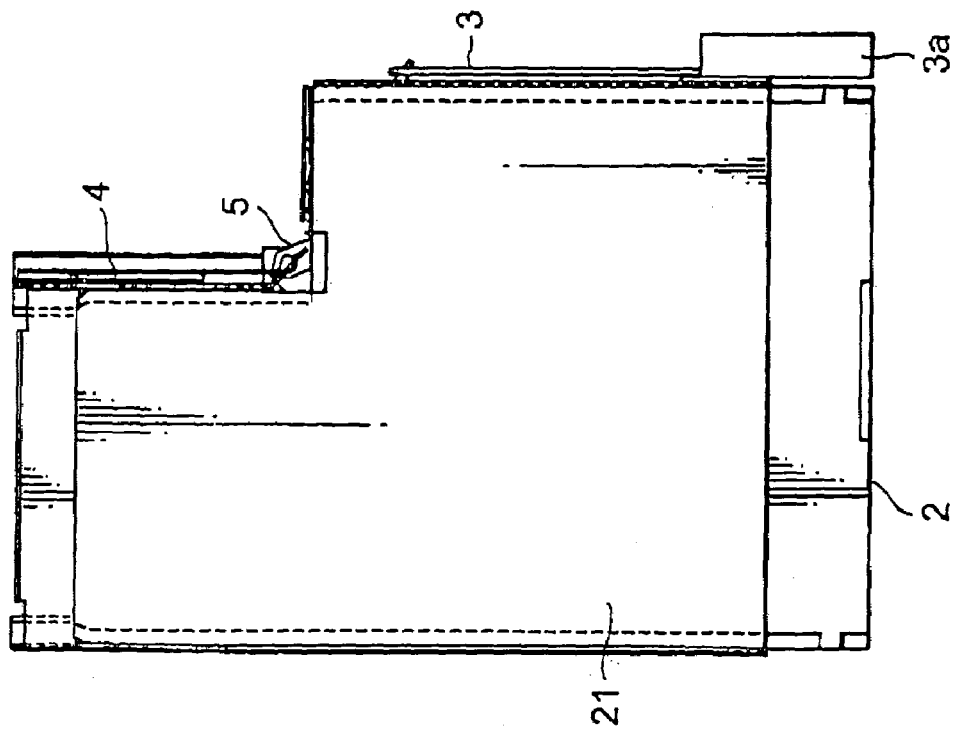

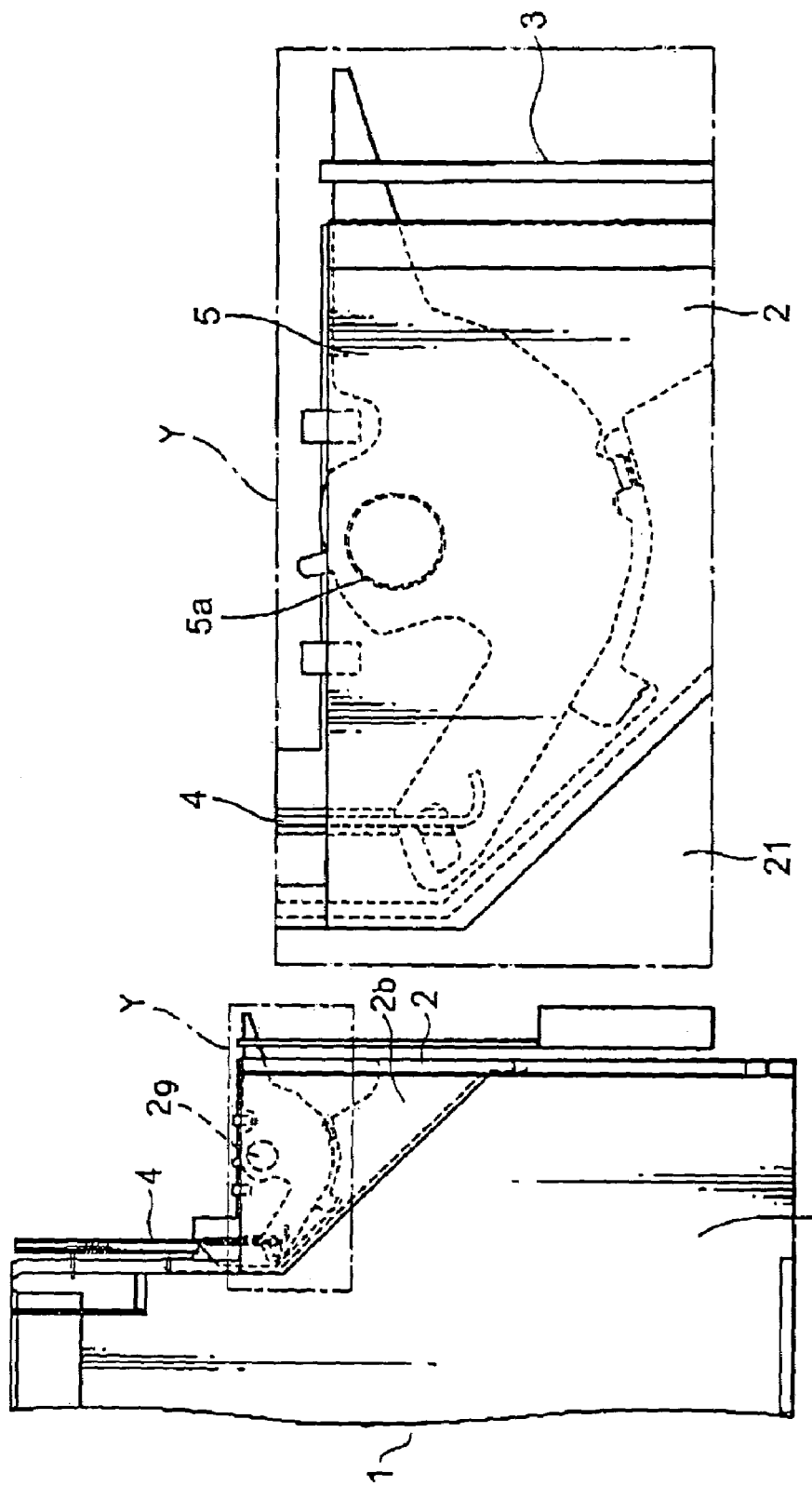

CONNECTOR IN WHICH EVEN A NARROW CARD IS SMOOTHLY GUIDED TO A CONNECTING POSITION

This application claims priority to prior Japanese application JP 2005-41003, the disclosure of which is incorporated herein by reference.

BACKGROUND OF THE INVENTION

This invention relates to a connector connectable selectively to two types of cards different in width.

For example; a card called an express card is used as an object to be connected to the connector. The express card is produced in accordance with a card standard defined by PCMCIA (Personal Computer Memory Card International Association) and has two types including a narrow card/34 module and a wide card/54 module. Therefore, a connector used for connection of the express card is desired to be connectable to both of the two types of cards.

For example, a connector of the type is disclosed in Japanese Unexamined Patent Application Publication (JP-A) No. 2004-318511 and has a housing adapted to receive a card to be inserted therein. The housing has a left insertion space and a right insertion space. Between the left and the right insertion spaces, a particular mechanism is disposed for guiding the narrow card to the left insertion space or the right insertion space. The mechanism has a rotary member rotated when it is pushed by the card. Thus, the narrow card is guided by the mechanism to one of the left and the right insertion spaces to be inserted therein. On the other hand, the wide card is inserted into a wide space as a combination of the left and the right insertion spaces.

As described above, the above-mentioned connector is adapted to connect each of two types of cards different in width. However, since the narrow card is guided by the particular mechanism having the rotary member to the left or the right insertion space, the card may not smoothly be guided to a predetermined connecting portion.

SUMMARY OF THE INVENTION

It is therefore an object of this invention to provide a connector in which not only a wide card but also a narrow card is smoothly guided to a predetermined connecting position.

It is another object of this invention to provide a connector reduced in size.

It is still another object of this invention to provide a connector in which a card is smoothly ejected.

It is yet another object of this invention to provide a connector which is capable of saving a space.

Other objects of the present invention will become clear as the description proceeds.

According to an aspect of the present invention, there is provided a connector adapted to be selectively connected to two types of cards inserted towards an insertion direction and different from each other in width thereof, the connector comprising a housing defining a guide space and having a guide portion for guiding an insertion of a selected one of the cards, the guide portion extending in the guide space in a particular direction intersecting the insertion direction, and an eject mechanism for moving the selected one towards a removing direction opposite to the first direction, the eject mechanism comprising an eject member to be engaged with the selected one and moved together with the selected one, an operating member for moving the eject member towards the removing direction, and a rotary member having a rotation center and rotatable around the rotation center to transmit operation of the operating member to the eject member, the rotation center being disposed in the guide space.

BRIEF DESCRIPTION OF THE DRAWINGS

FIG. 2A is a top rear perspective view of a first card;

FIG. 2B is a bottom rear perspective view of the first card;

FIG. 2C is a bottom front perspective view of the first card;

FIG. 3A is a top rear perspective view of a second card;

FIG. 3B is a bottom rear perspective view of the second card;

FIG. 3C is a bottom front perspective view of the second card;

FIG. 4A is a front view of the second card;

FIG. 4B is a plan view of the second card;

FIG. 4C is a rear view of the second card;

FIG. 4D is a left side view of the second card;

FIG. 4E is a right side view of the second card;

FIG. 4F is a bottom view of the second card;

FIG. 13 is a perspective view similar to FIG. 12 with an inner structure seen through;

FIG. 14A is a perspective view of an eject mechanism of the card connector in FIG. 1A as seen in one direction;

FIG. 14B is a perspective view similar to FIG. 14A as seen in another direction;

FIG. 14C is an enlarged view of a rectangular part X in FIG. 14B;

FIG. 15A is a plan view of the card connector in FIG. 1A when a second card is fitted thereto;

FIG. 15B is a plan view similar to FIG. 15A when the second card is ejected therefrom;

FIG. 16A is a plan view of the second card and the eject mechanism in an ejected state;

FIG. 16B is an enlarged view of a rectangular part Y in FIG. 16A;

DESCRIPTION OF THE PREFERRED EMBODIMENTS

Figure 1B:
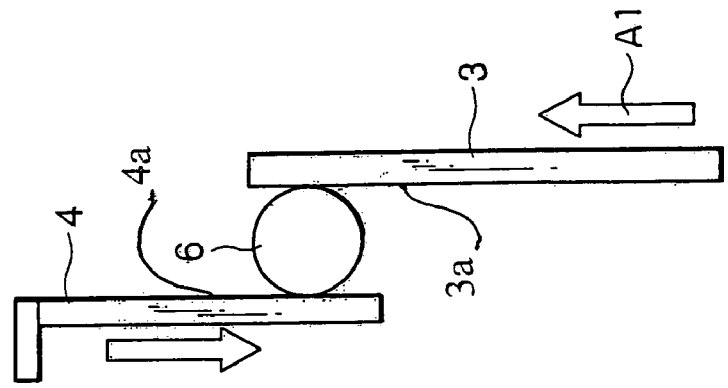
FIG. 1B is a schematic view of a characteristic part of a modification of the card connector illustrated in FIG. 1A.
Figure 1A:
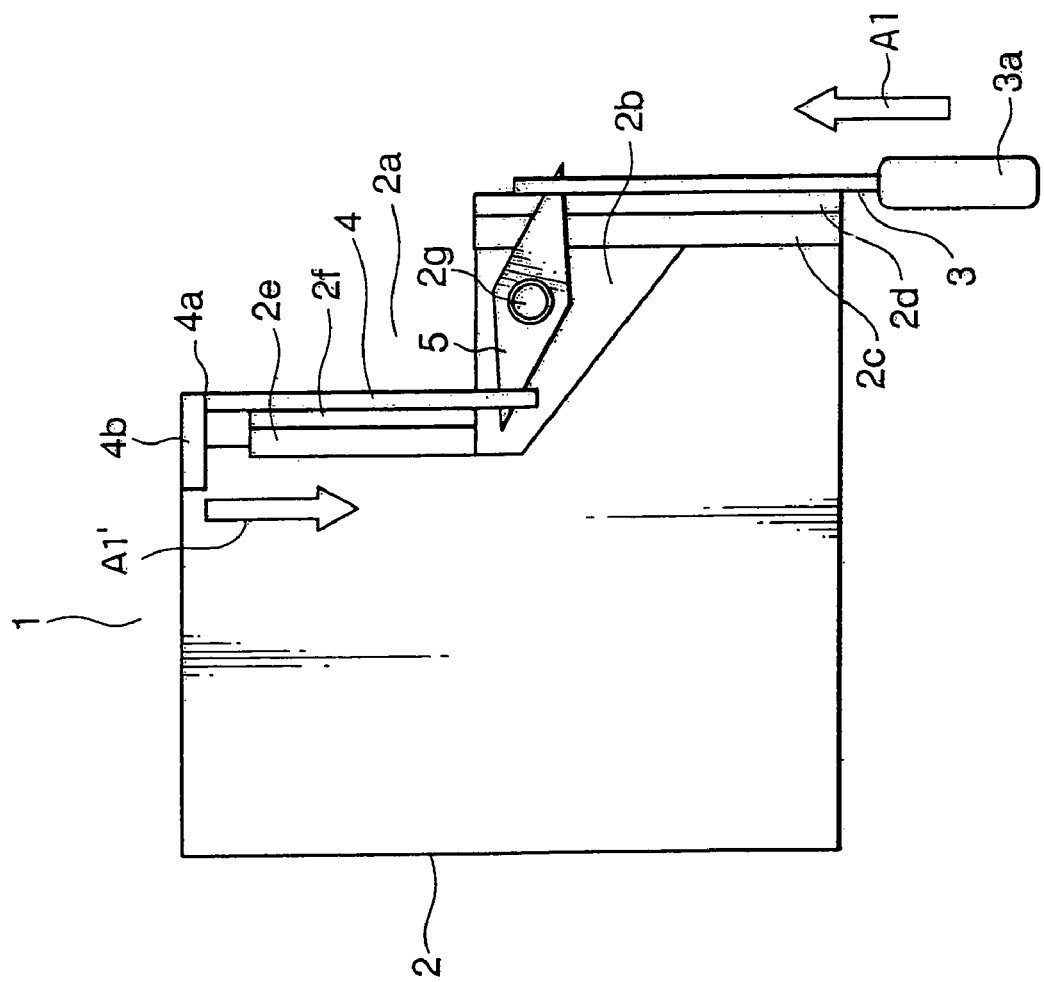
FIG. 1A is a schematic view of a characteristic part of a card connector according to an embodiment of this invention.

Referring to FIG. 1A, description will be made of a card connector (hereinafter simply be referred to as a "connector") according to an embodiment of this invention.

As will be understood from the following description, the connector depicted at 1 in the figure uses a rotary lever mechanism and has a rectangular housing 2. The housing 2 has a rectangular cutout portion 2a formed at a right upper corner thereof, a guide space 2b formed under the cutout portion 2a to guide a first card, and a first guide wall 2c and a first slide guide 2d which are formed on the right side of the guide space 2b. In parallel to the first slide guide 2d, a first eject bar 3 is arranged to be slidable. The first eject bar 3 has an operation button 3a.

The housing 2 is provided with a second guide wall 2e and a second slide guide 2f which are formed on its right side surface adjacent to the cutout portion 2a. In parallel to the second slide guide 2f, a second eject bar 4 is arranged to be slidable. The second eject bar 4 has an end portion 4a and an eject portion 4b protruding from the end portion 4a in a direction perpendicular thereto.

In the guide space 2b, a shaft 2g is disposed and supports a rotary lever 5 fitted over the shaft 2g. The first eject bar 3 is engaged with one end of the rotary lever 5. The second eject bar 4 is engaged with the other end of the rotary lever 5. Since the rotary lever 5 is disposed in the guide space 2b, it is possible to arrange parts or components of the connector in the cutout portion 2a. Thus, the cutout portion 2a can effectively used to achieve a space-saving effect.

Next, description will be made of an eject operation when a first card 11 (see FIGS. 2A to 2C) or a second card 21 (see FIG. 3) is fitted to the connector 1.

First, it is assumed that the first card 11 (not shown) is inserted into a left side of the housing 2. When the operation button 3a is pushed in an insertion direction or a first direction A1, the rotary lever 5 is rotated counterclockwise around the shaft 2g. Then, the second eject bar 4 slides in an opposite direction A1' opposite to the first direction A1 so that the eject portion 4b pushes a front end 11a of the first card 11. As a consequence, the first card 11 is ejected from the connector 1.

Next, it is assumed that the second card 21 is inserted into the housing 2. When the operation button 3a is pushed, the eject portion 4b pushes a front end 21a of the second card 21 in the manner similar to that described in connection with the first card 11. As a consequence, the second card 21 is ejected from the connector 1.

An operation of inserting the first or the second card 11 or 21 will be described later.

The connector 1 in FIG. 1A uses the rotary lever mechanism. Alternatively, a gear mechanism may be used instead as illustrated in FIG. 1B. Specifically, in the connector using the gear mechanism, the first and second eject bar 3 and 4 is provided with racks 3a and 4a which are engaged with a spur gear 6 disposed between the first and second eject bars 3 and 4.

Referring to FIGS. 2A to 2C, the first card 11 will be described.

The first card 11 is an express card/34 module and has a rectangular shape. The first card 11 has a pair of narrow grooves 11b formed on longitudinal opposite sides of a top surface thereof and extending in a longitudinal direction (insert/eject direction). The first card 11 has a pair of wide grooves 11c1 formed on longitudinal opposite sides of a bottom surface thereof in the vicinity of the front end 11a. Furthermore, the first card 11 has a pair of narrow grooves 11c2 continued from the wide grooves 11c1, respectively. The first card 11 further has, adjacent to each of the wide grooves 11c1, a corner portion 11d, a tapered portion 11e, and a parallel surface 11f. Each of the corner portions 11d, the tapered portions 11e, and the parallel surfaces 11f will be called here a guided portion.

Referring to FIGS. 3A to 3C and 4A to 4F, the second card 21 will be described.

The second card 21 is an express card/54 module. The second card 21 has a shape such that a small rectangle around an upper right corner of a large rectangle is cut away and has a cutout portion 21b. The second card 21 has a pair of narrow grooves 21c formed on longitudinal opposite sides of a top surface thereof. The second card 21 has a pair of wide grooves 21d1 formed on longitudinal opposite sides of a bottom surface thereof in the vicinity of the front end 21a. The second card 21 is provided with a pair of narrow grooves 21d2, a pair of generally triangular grooves 21d3, and a pair of narrow grooves 21d4 successively formed continuously from the grooves 21d1, respectively. Since the second card 21 has the generally triangular grooves 21d3, the second card 21 is not brought into contact with the rotary lever 5, the shaft 2g, and the second eject bar 4 as an eject mechanism when the second card 21 is fitted to the connector 1.

Next referring to FIGS. 5 to 11, description will be made of an insertion process of the first card 11.

Figure 5:
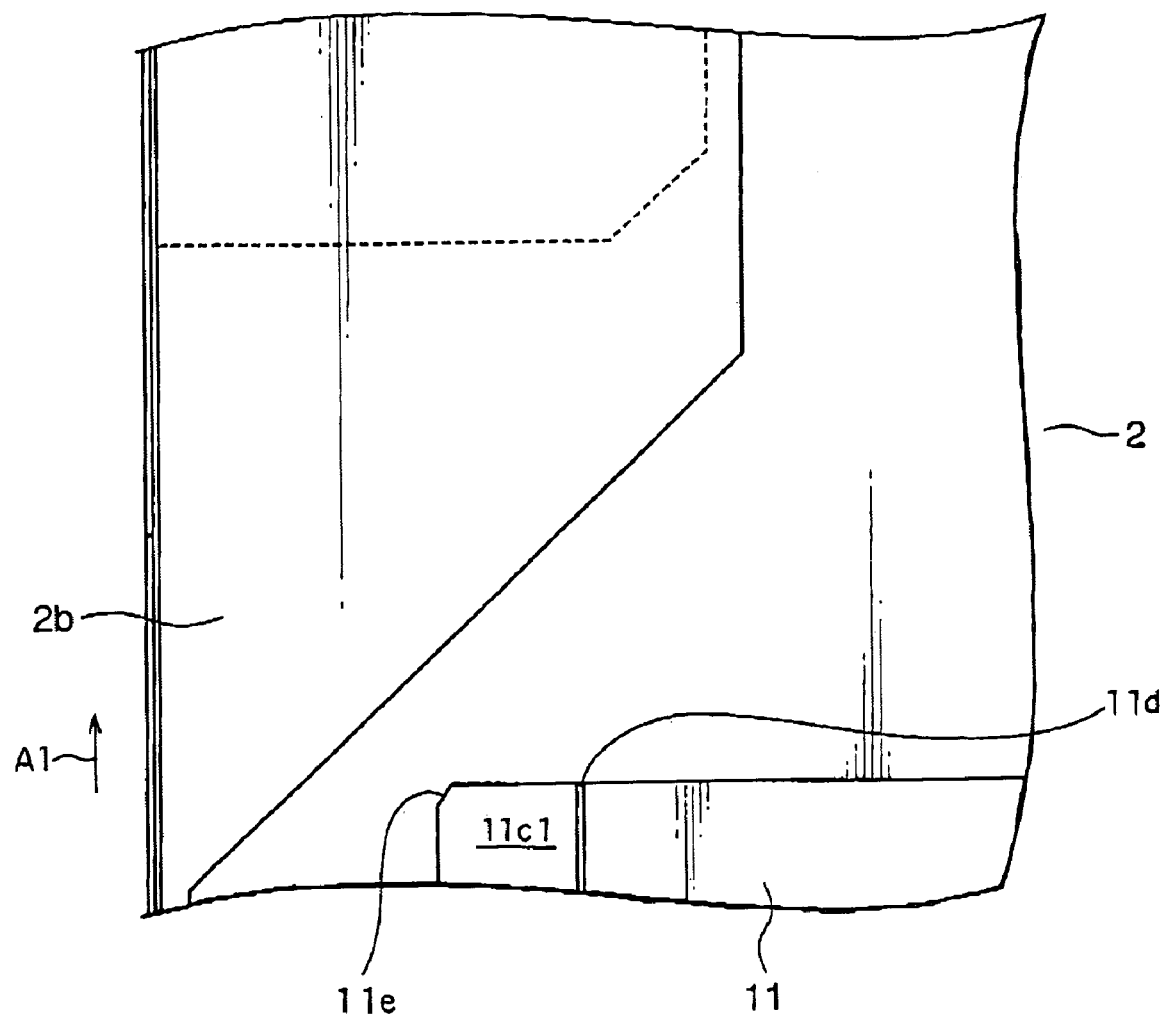
FIG. 5 is a bottom view of a characteristic part of the card connector in FIG. 1A in a first stage of insertion of the first card.
Figure 6:
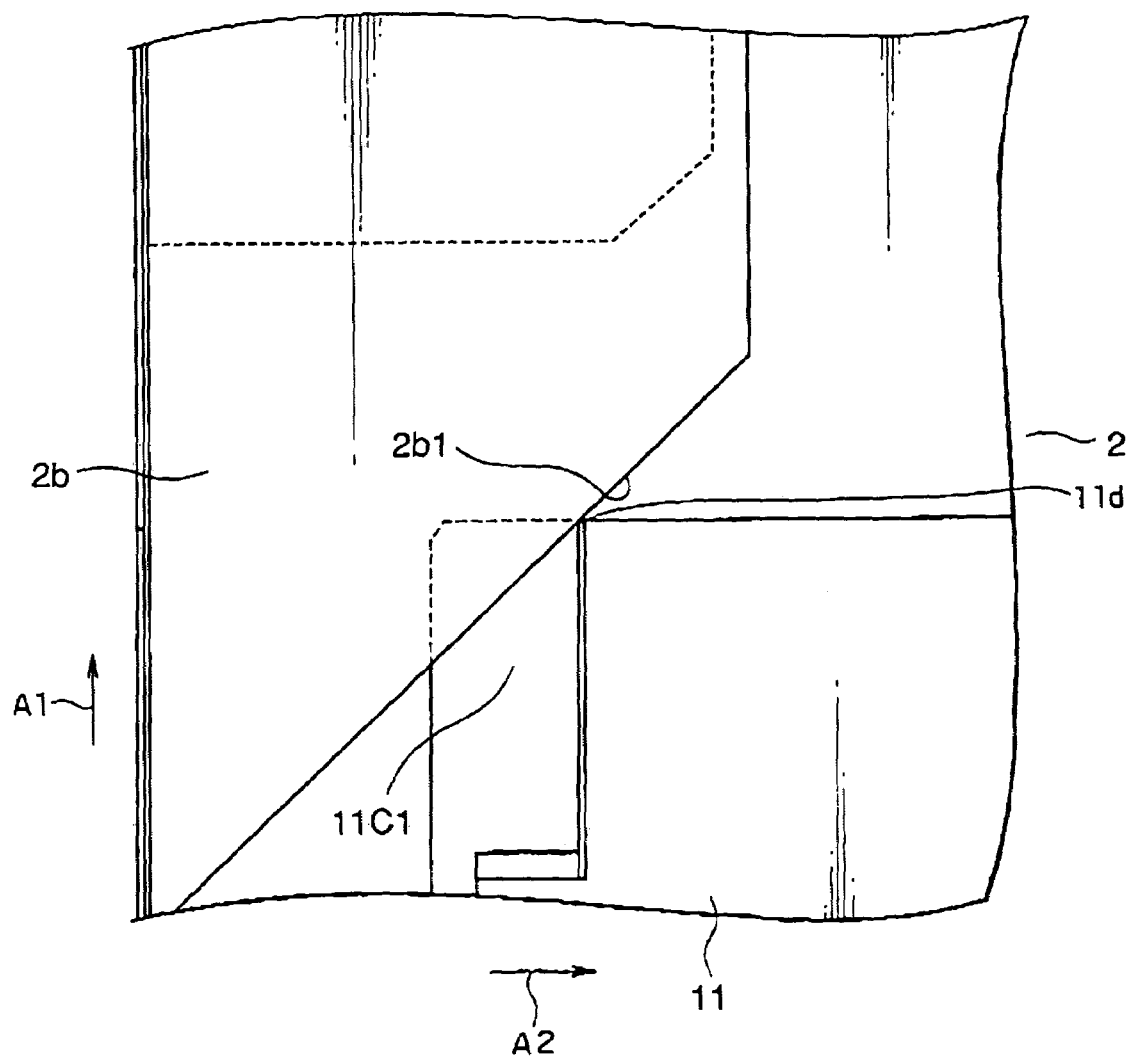
FIG. 6 is a bottom view similar to FIG. 5 in a second stage.

In a first stage illustrated in FIG. 5, the first card 11 started to be inserted into the housing 2 in the first direction A1. When insertion of the first card 11 proceeds to reach a second stage illustrated in FIG. 6, the corner portions 11d of the first card 11 are contacted with an inclined guide surface 2b1 of the guide space 2b of the housing 2. The inclined guide surface 2b1 is inclined with respect to the first direction A1 and is referred to as a guide portion.

Figure 7:
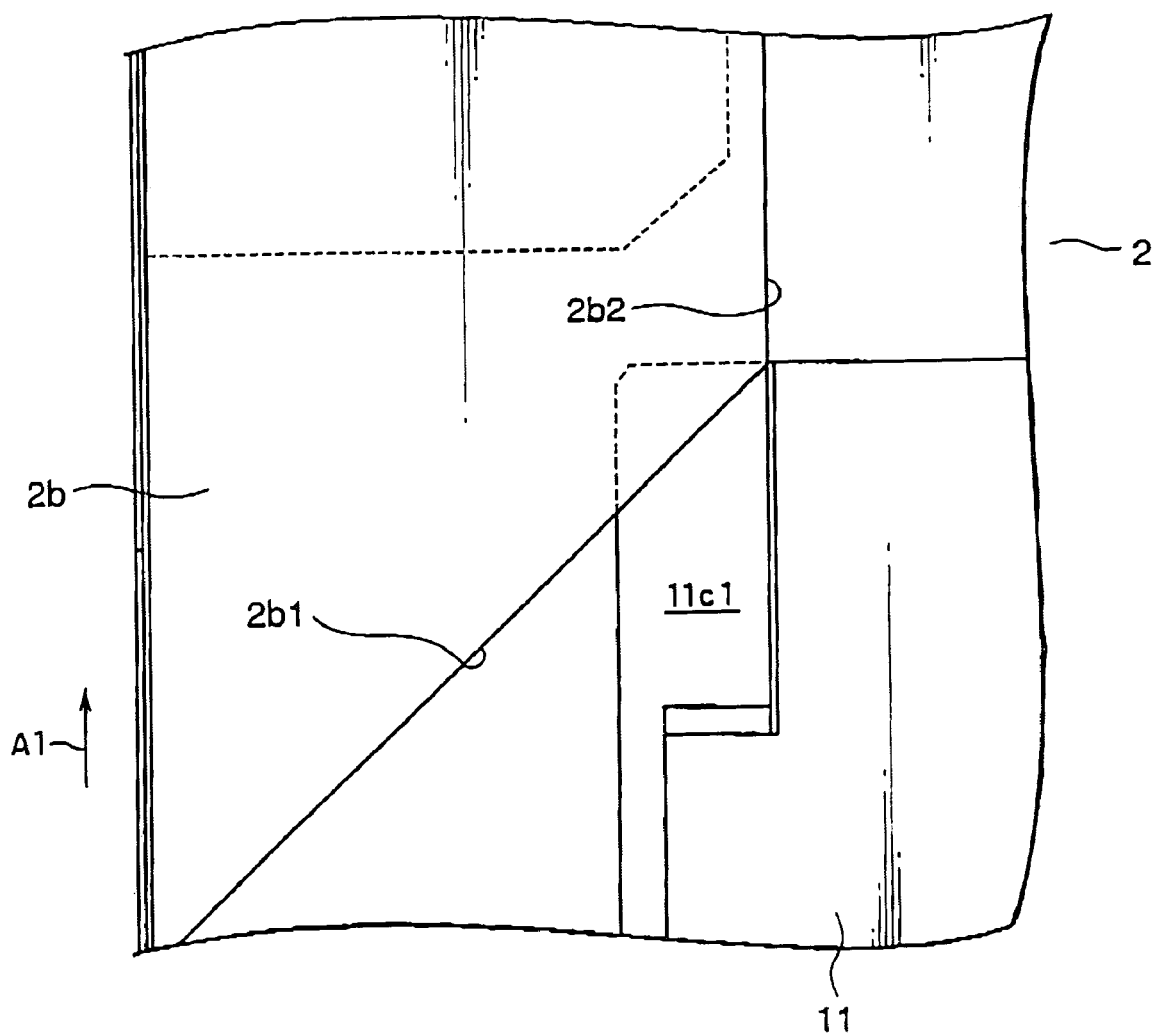
FIG. 7 is a bottom view similar to FIG. 5 in a third stage.

When the insertion of the first card 11 further proceeds, the first card 11 is moved in the first direction A1 and a particular direction or a second direction A2 perpendicular to the first direction A1. Then, a third stage illustrated in FIG. 7 is reached. In the third stage, the corner portions 11d of the first card 11 are started to be guided by a parallel guide surface 2b2 of the guide space 2b of the housing 2. The parallel guide surface 2b2 is parallel to the first direction A1.

Figure 8:
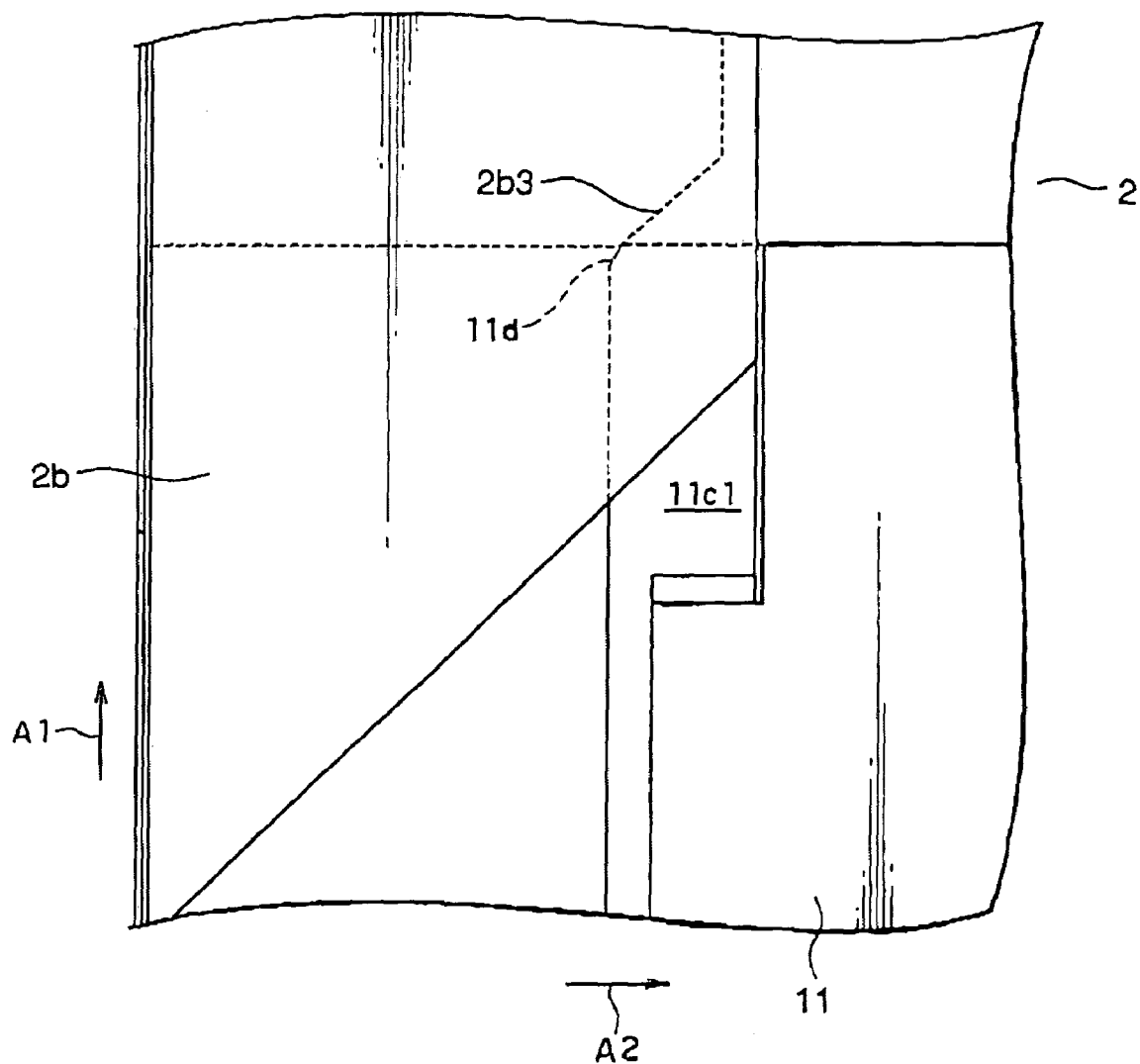
FIG. 8 is a bottom view similar to FIG. 5 in a fourth stage.

When the insertion of the first card 11 still further proceeds, the first card 11 is moved only in the first direction A1. Then, a fourth stage illustrated in FIG. 8 is reached. In the fourth stage, the tapered portion 11e of the first card 11 is started to be guided by an inclined guide surface 2b3 of the guide space 2b of the housing 2. The inclined guide surface 2b3 is also inclined with respect to the first direction.

Figure 9:
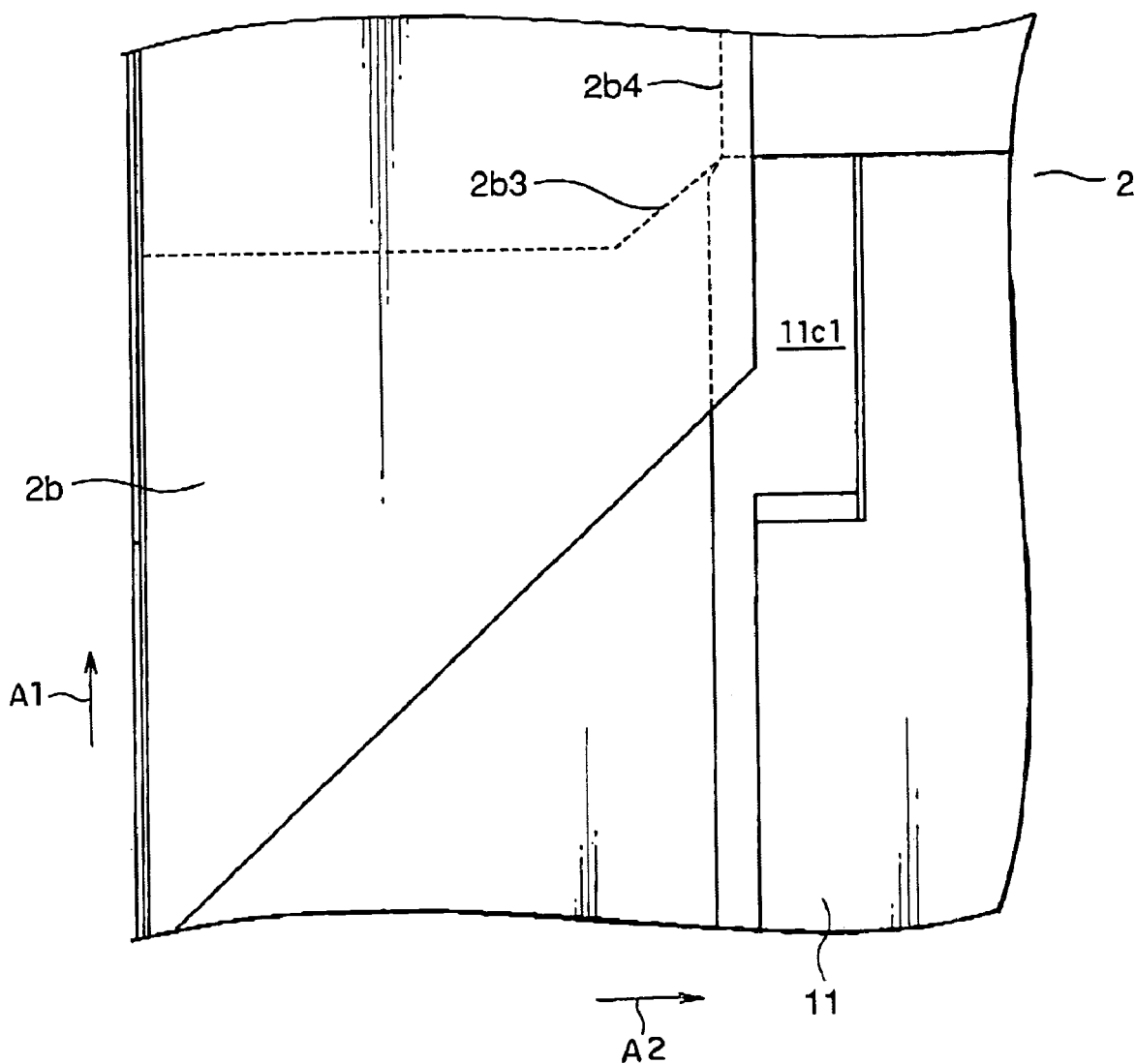
FIG. 9 is a bottom view similar to FIG. 5 in a fifth stage.

When the insertion of the first card 11 yet further proceeds, the first card 11 is moved in the first and the second directions A1 and A2. Then, a fifth stage illustrated in FIG. 9 is reached. In the fifth stage, the tapered portion 11e of the first card 11 is started to be guided by a parallel guide surface 2b4 of the guide space 2b of the housing 2.

Figure 10:
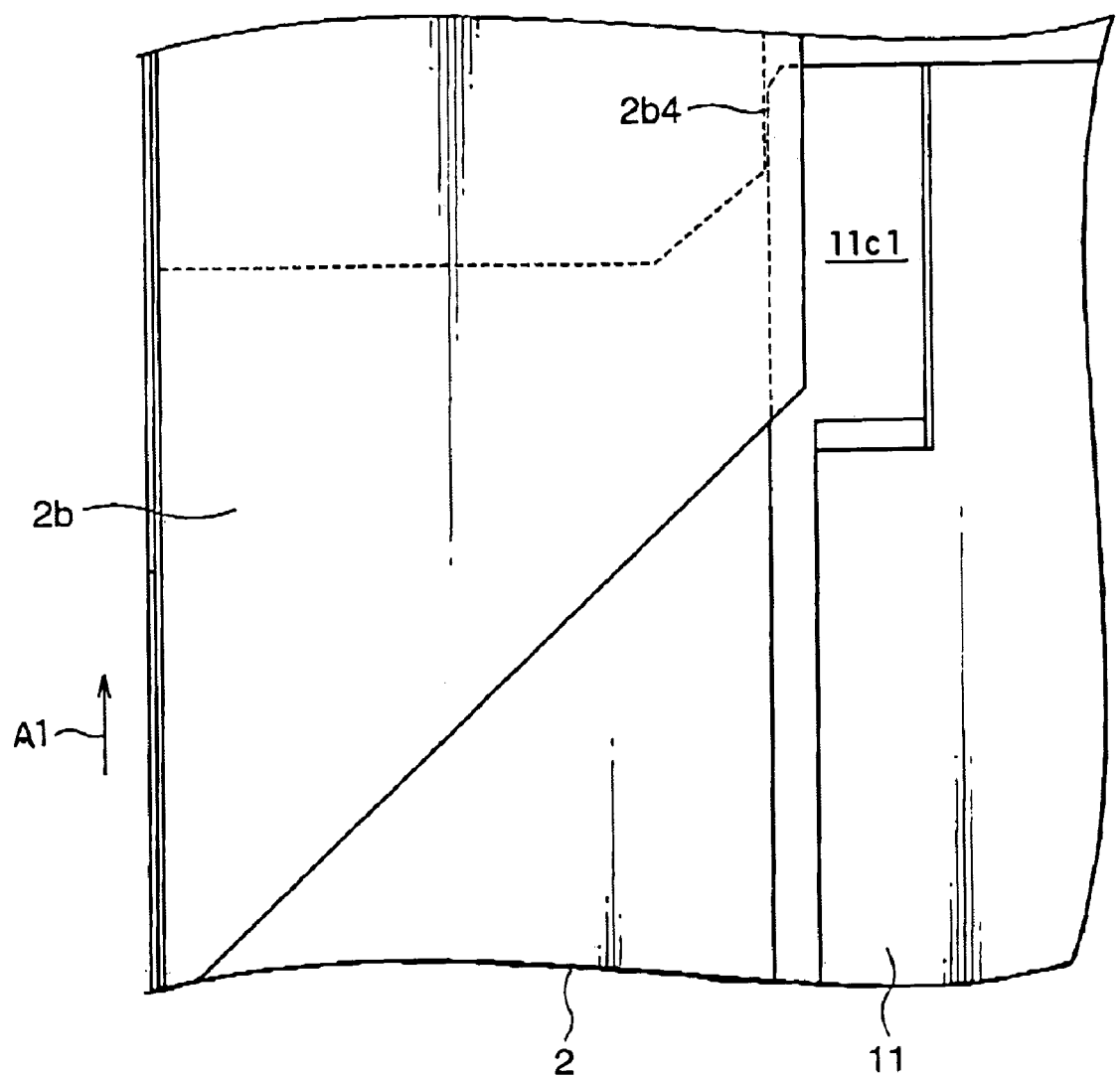
FIG. 10 is a bottom view similar to FIG. 5 in a sixth stage.
Figure 11:
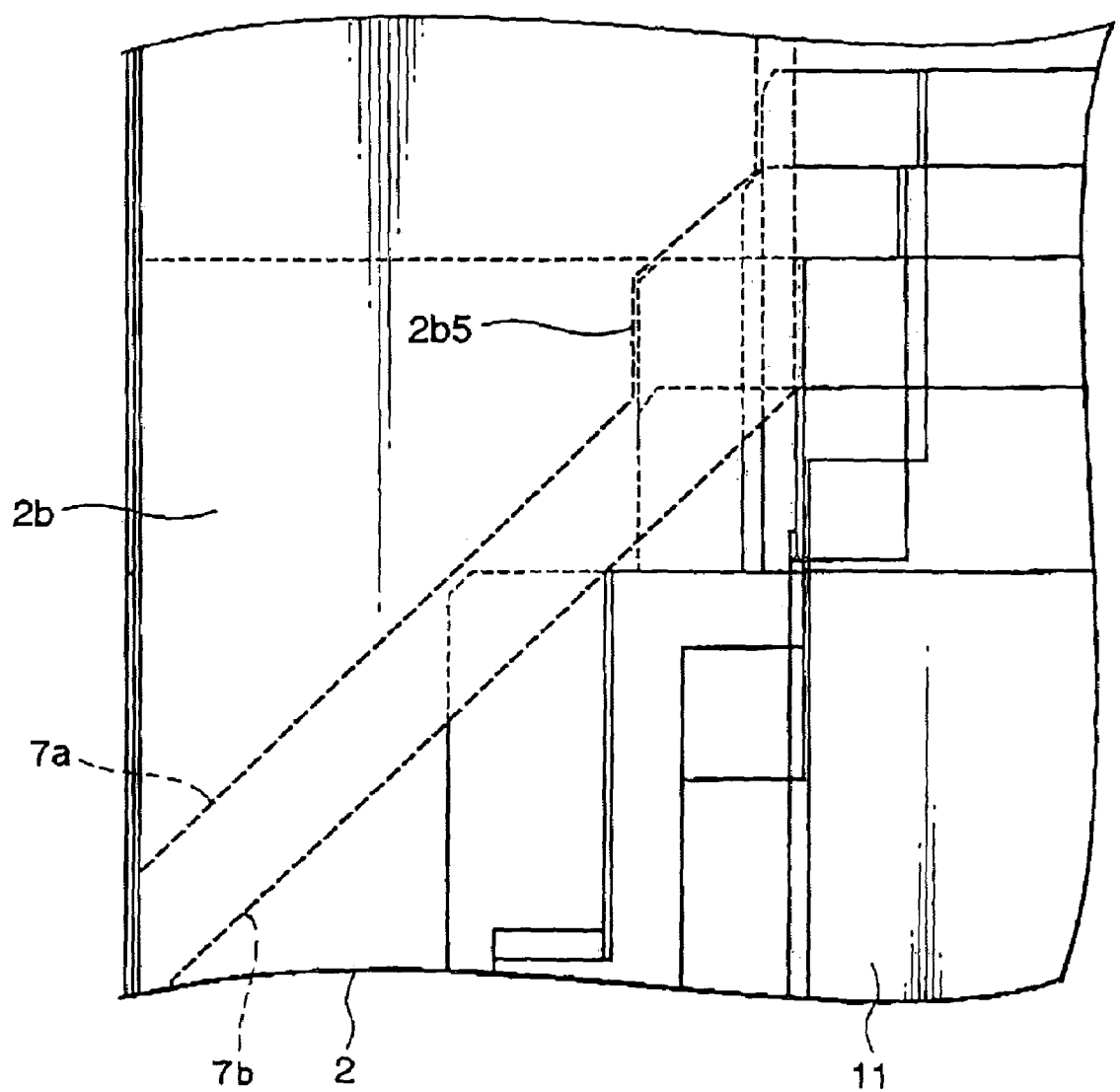
FIG. 11 is a bottom view showing a path of the first card in the card connector illustrated in FIG. 1A.
Figure 12:
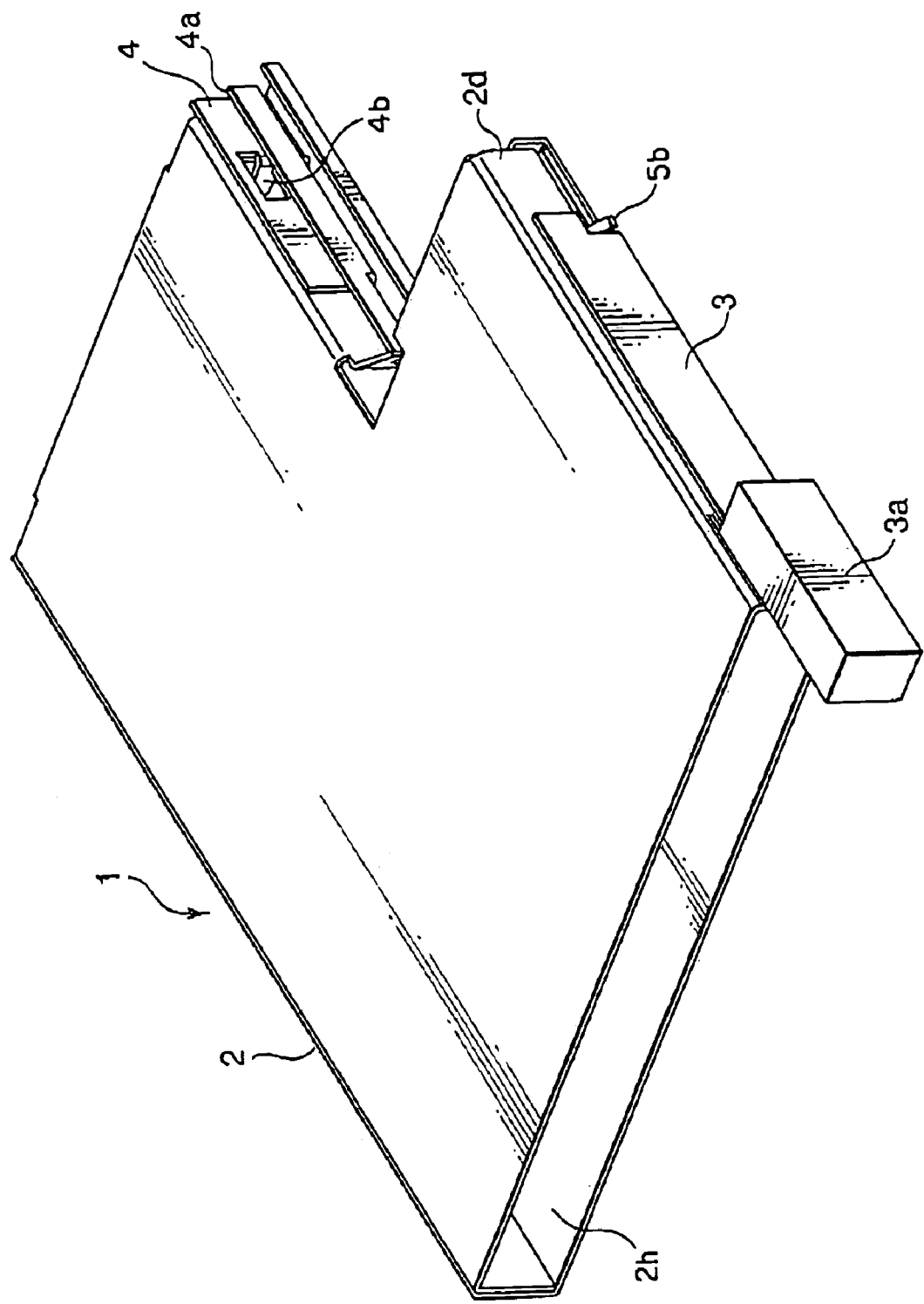
FIG. 12 is a perspective view of the card connector in FIG. 1A as seen from the side of a first eject bar.
Figure 13:
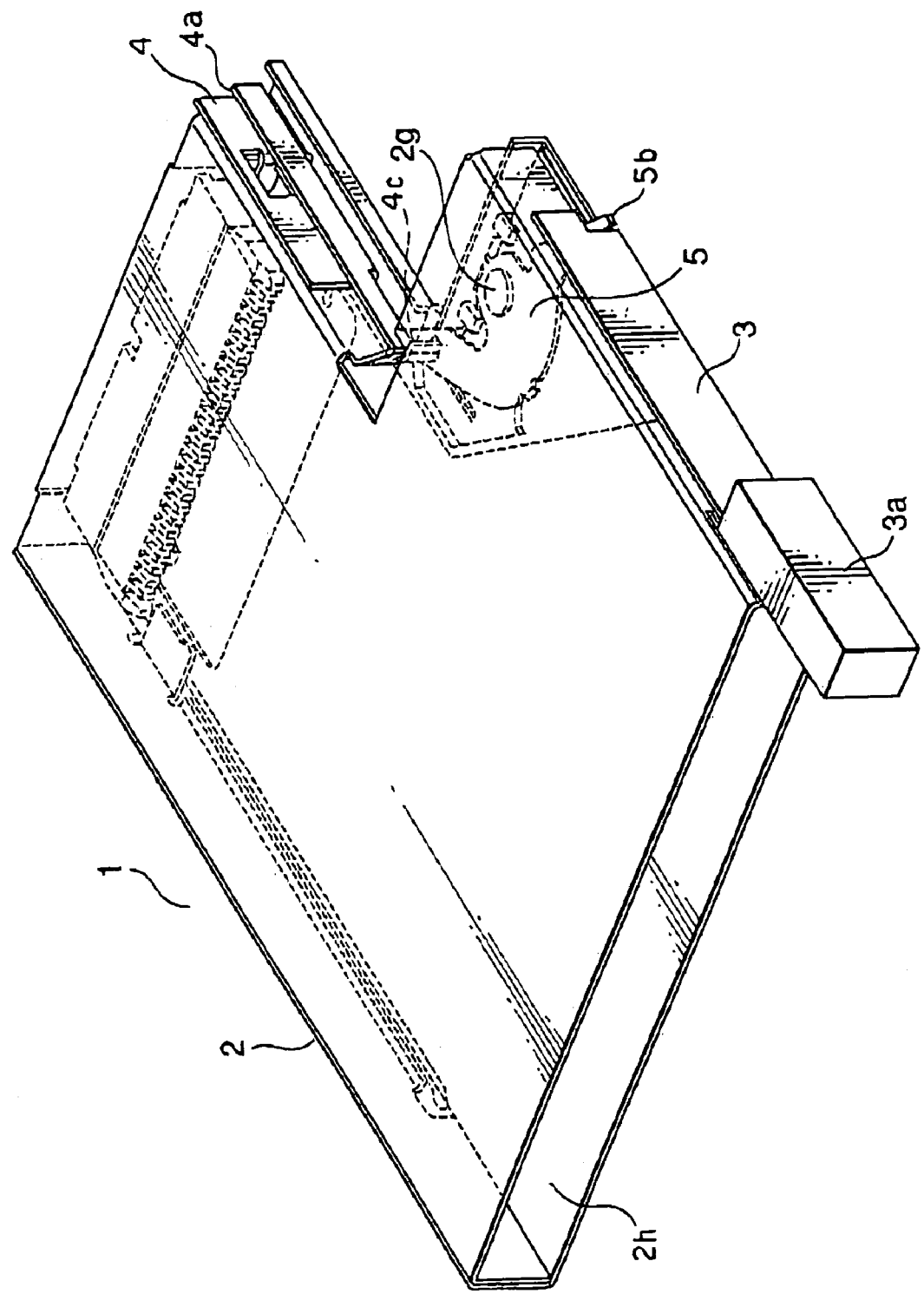
Figure 17:
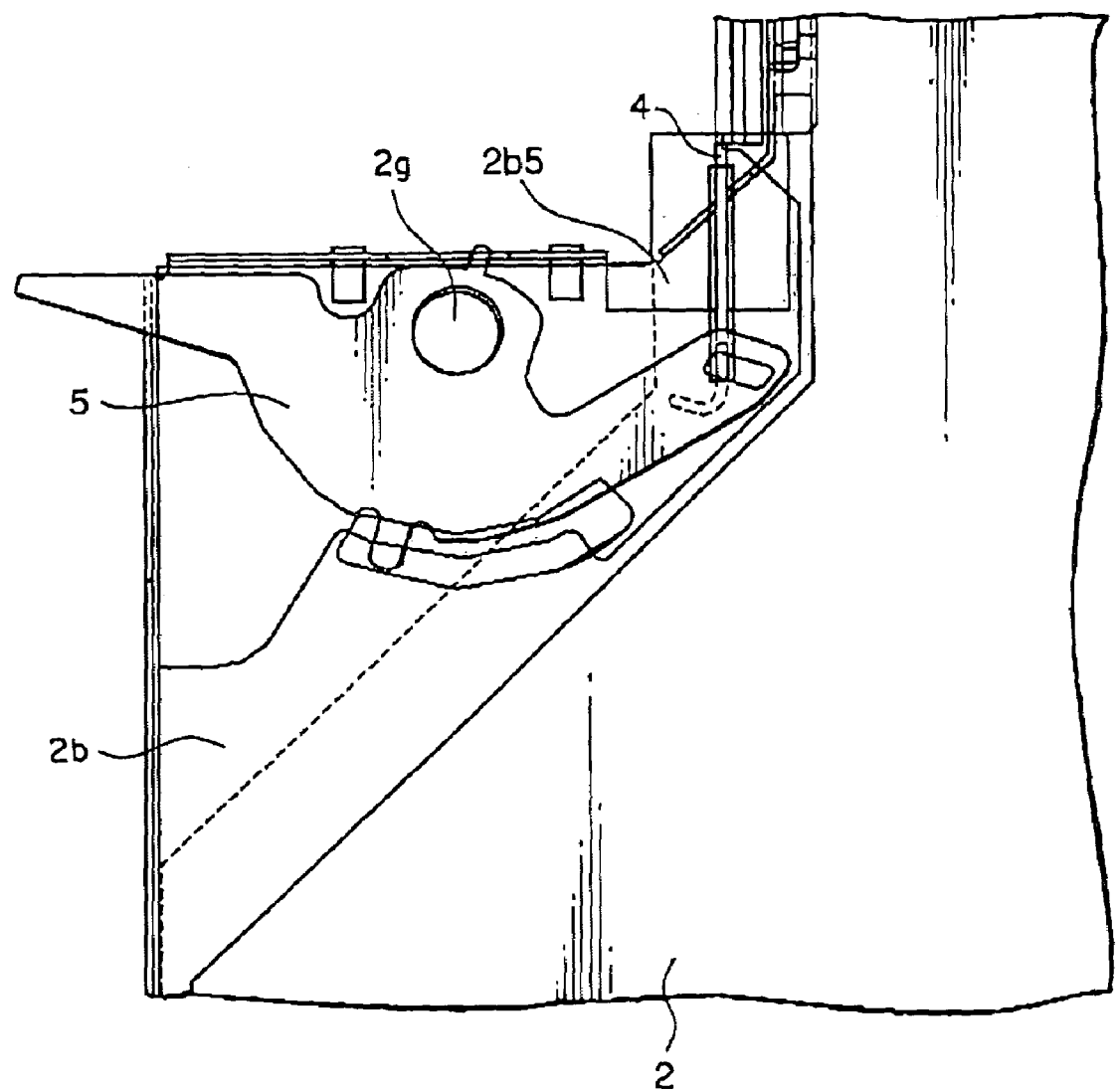
FIG. 17 is a bottom view of the eject mechanism in the ejected state.

When the insertion of the card 11 further proceeds, the first card 11 is moved only in the first direction A1. Then, a sixth stage illustrated in FIG. 10 is reached. In the sixth stage, a left side surface of the groove 11c1 on the left side of the bottom surface of the first card 11 is guided by the parallel guide surface 2b4 of the guide space 2b of the housing 2. In FIG. 11, an area between two broken lines 7a and 7b shows a path 2b5 of the first card 11 in the connector 1. A combination of the inclined guide surfaces 2b1 and 2b3 will be called an inclined surface. A combination of the inclined guide surfaces 2b1 and 2b3 and the parallel guide surfaces 2b2 and 2b4 will be referred to as a guide surface.

Referring to FIGS. 12 to 17, the connector 1 will be described in detail.

The housing 2 has an insertion slot 2h through which the card is inserted into the housing 2. The rotary lever 5 has a hole 5a fitted over the shaft 2g of the housing 2. The rotary lever 5 has one end 5b engaged with a right-angled portion 3b formed at an end of the first eject bar 3. The rotary lever 5 has the other end 5c provided with a hole 5c1 engaged with a protruding portion 4d formed in the vicinity of a curved rear end 4c of the second eject bar 4. The rear end 4c of a smooth shape is positioned nearer to the insertion slot 2h than engaging portions 4d and 5c1 of the second eject bar 4 and the rotary lever 5. The shaft 2g of the housing 2 is disposed in the guide space 2b. Since the rear end 4c (see FIG. 14) of the second eject bar 4 has an R shape (smooth shape), the rear end 4c is brought into contact with an end of the card to smoothly guide the card to a predetermined fitting position. The rear end 4c will be referred to as a contact portion.

The second eject bar 4 further has an extended portion 4e extended from the rear end 4c. The extended portion 4e has an end 4f displaced from the rear end 4c towards the insertion direction or the first direction A1.

Referring to FIGS. 18 to 25 in addition, description will be made of the insertion process of the first card 11 more in detail.

Figure 18:
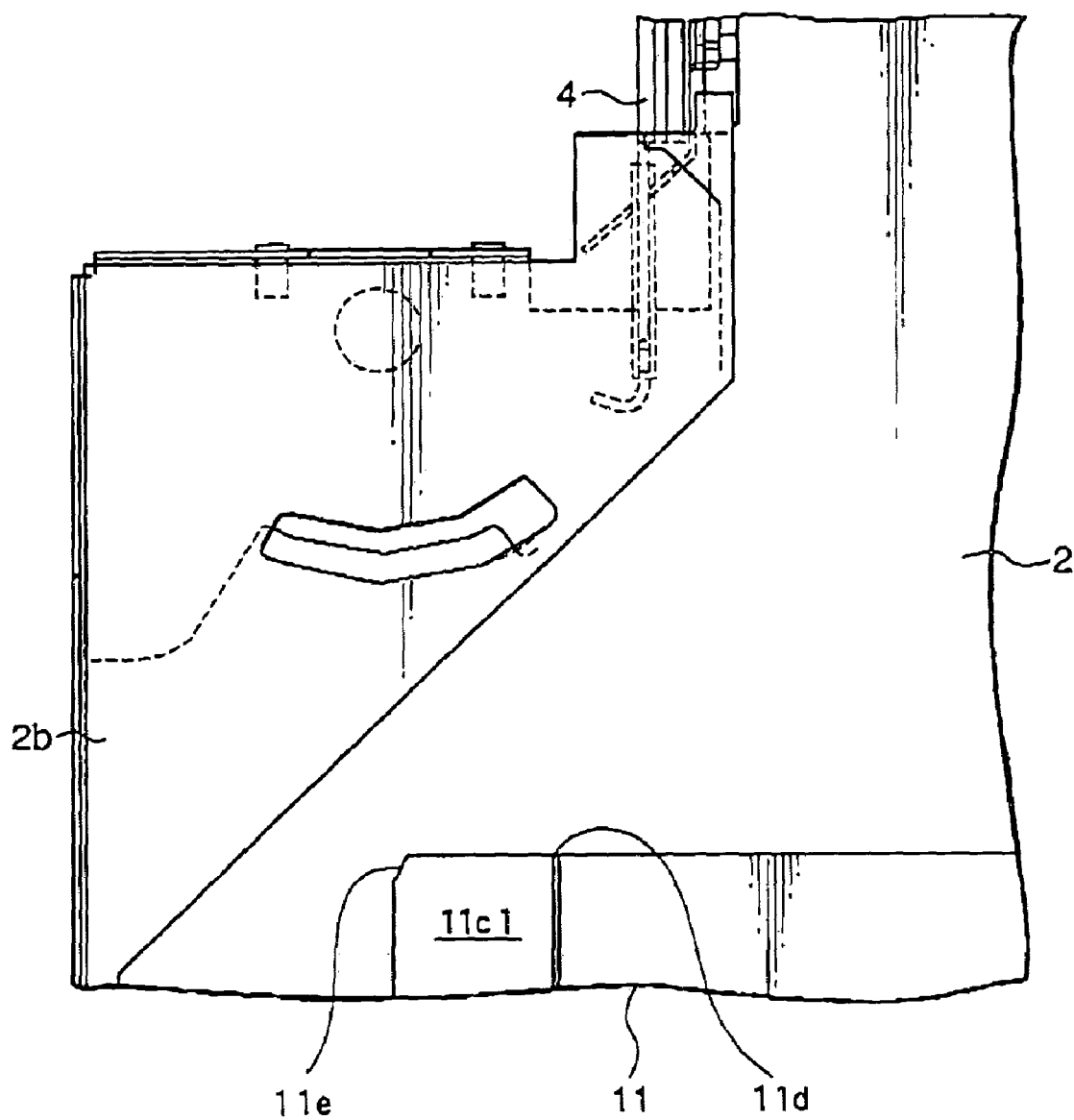
FIG. 18 is a bottom view of a characteristic part of the card connector in FIG. 1A in a first stage of insertion of the first card, with a second eject bar faced to the first card.

In a first stage illustrated in FIG. 18, the first card 11 is started to be inserted into the housing 2. In the first stage, the second eject bar 4 is faced to the first card 11.

Figure 19:
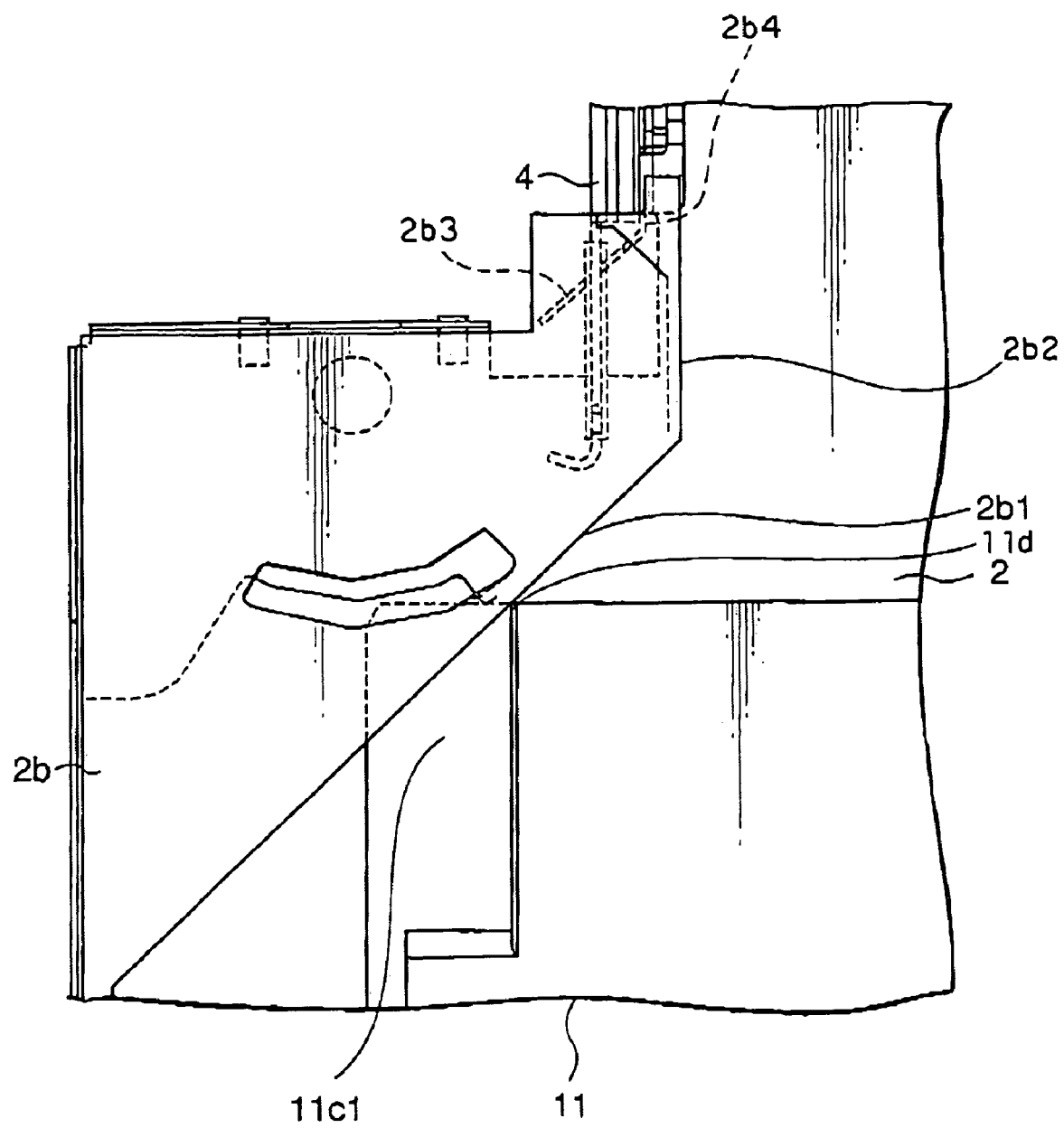
FIG. 19 is a bottom view similar to FIG. 18 in a second stage.

When the insertion of the first card 11 slightly proceeds to reach a second stage illustrated in FIG. 19, the first card 11 is closely adjacent to the second eject bar 4. Further, the corner portions 11d of the first card 11 are brought into contact with the inclined guide surface 2b1 to be guided.

Figure 20:
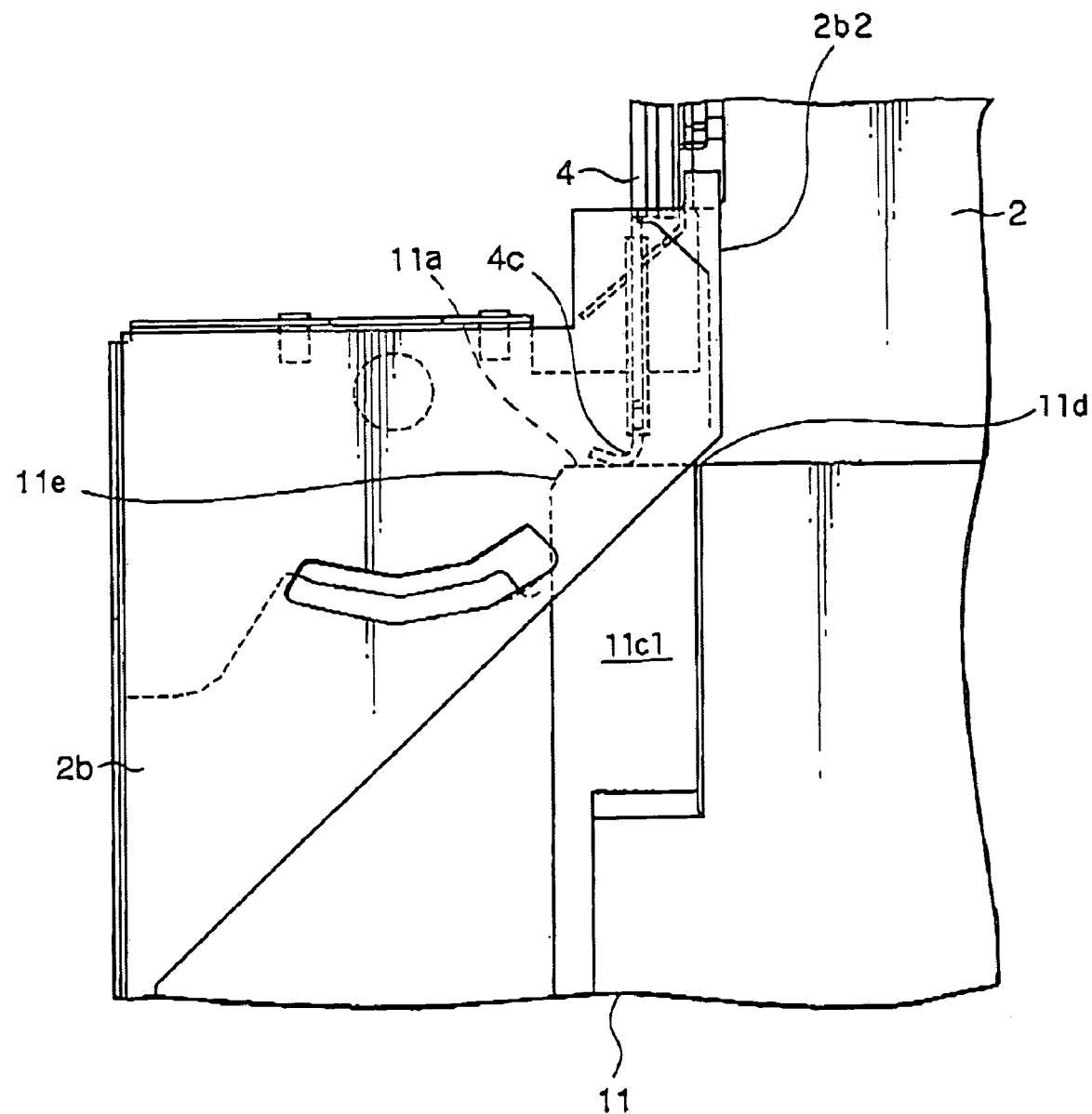
FIG. 20 is a bottom view similar to FIG. 18 in a third stage.

When the insertion of the first card 11 further proceeds, a third stage illustrated in FIG. 20 is reached. In the third stage, the front end 11a of the first card 11 is brought into contact with the curved rear end 4c of the second eject bar 4.

Figure 21:
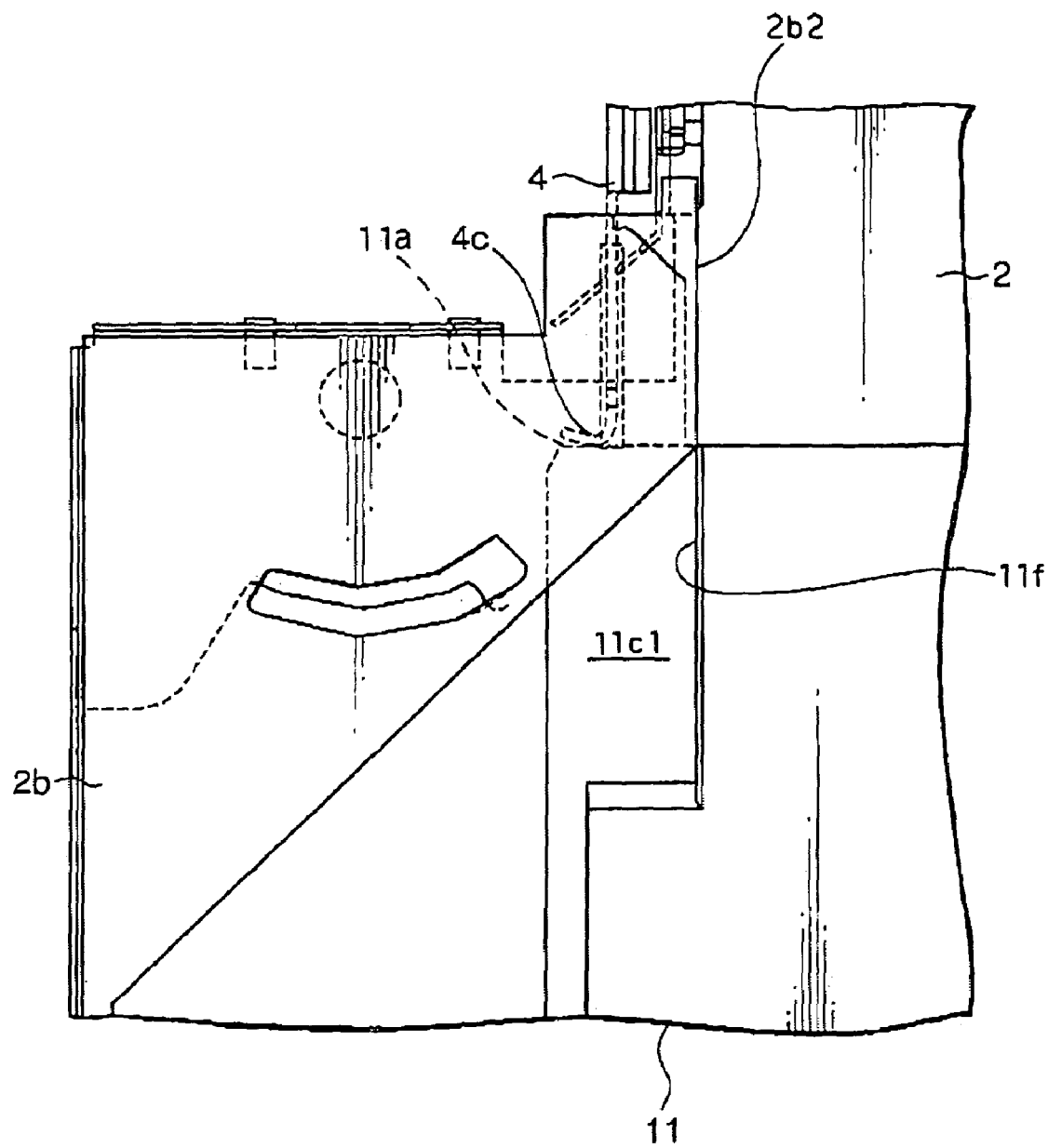
FIG. 21 is a bottom view similar to FIG. 18 in a fourth stage.

When the insertion of the first card 11 further proceeds, a fourth stage illustrated in FIG. 21 is reached. In the fourth stage, the front end 11a of the first card 11 pushed the rear end 4c of the second eject bar 4 to slide the second eject bar 4. At this time, the parallel surface 11f of the first card 11 is guided by the parallel guide surface 2b2 of the guide space 2b.

Figure 22:
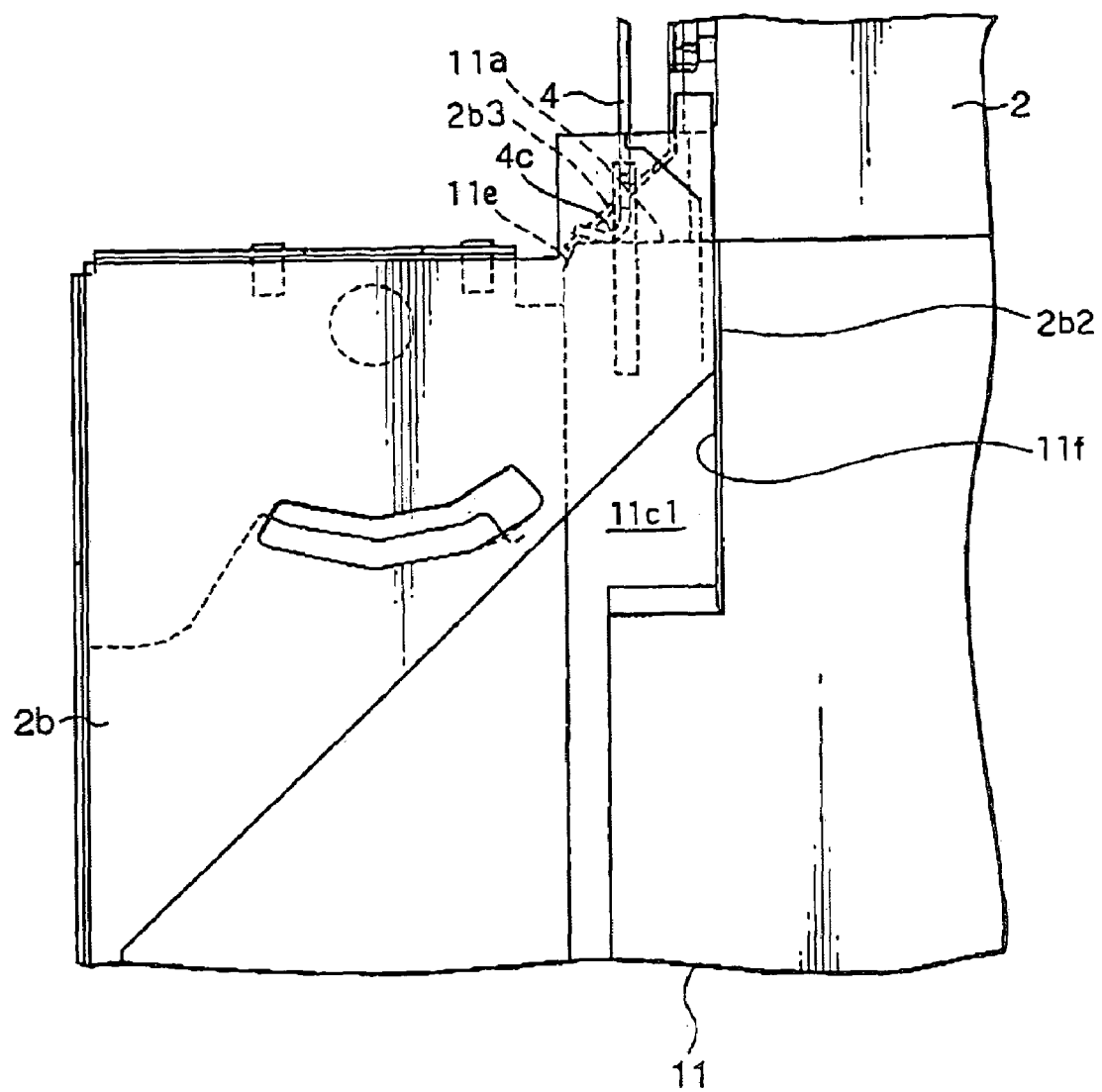
FIG. 22 is a bottom view similar to FIG. 18 in a fifth stage.

When the insertion of the first card 11 further proceeds, a fifth stage illustrated in FIG. 22 is reached. In the fifth stage, the front end 11a of the first card 11 further pushes the rear end 4c of the second eject bar 4 to further slide the second eject bar 4. In addition, the tapered portion 11e of the first card 11 slides along the inclined guide surface 2b3 of the guide space 2b of the housing 2.

Figure 23:
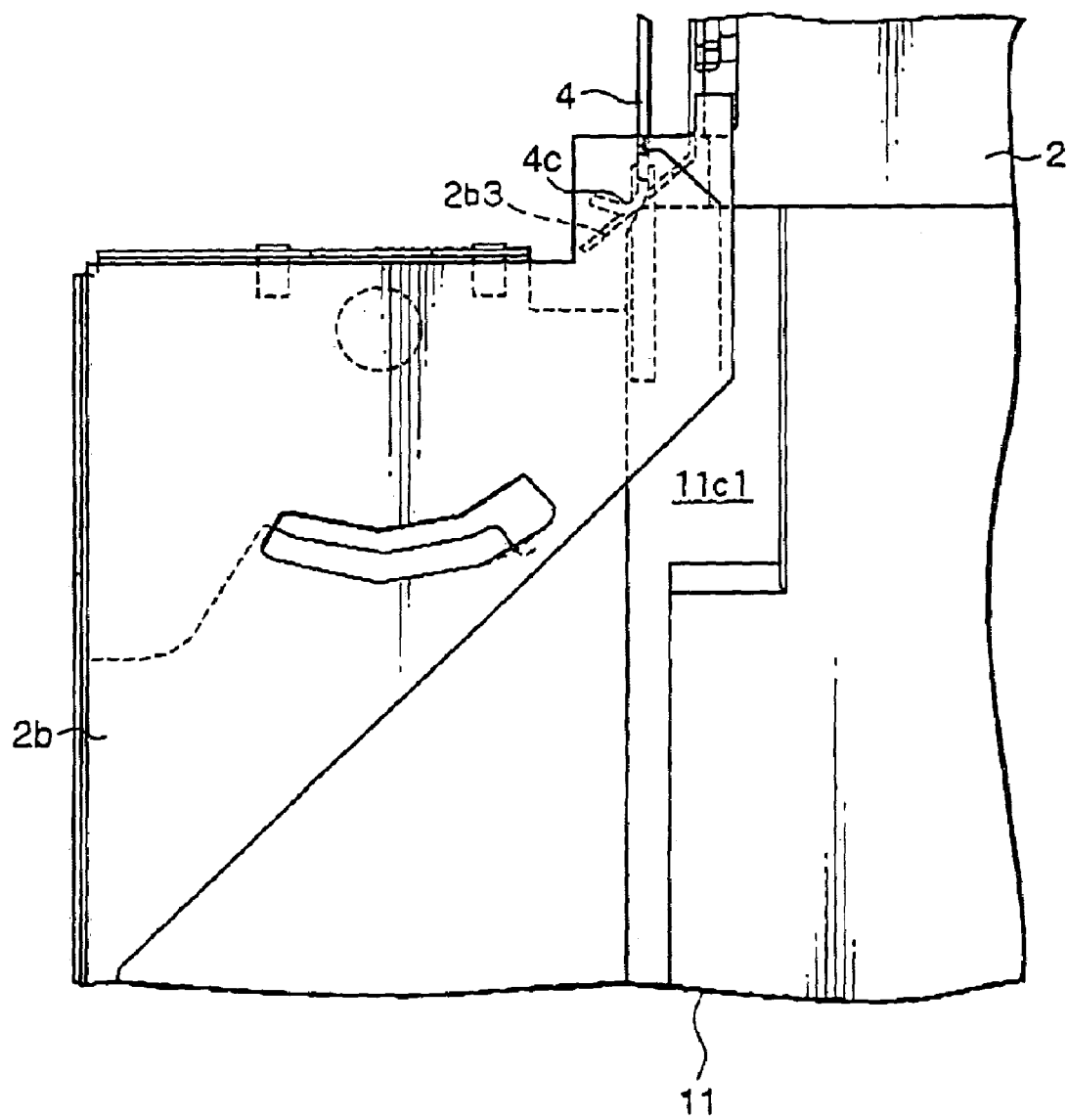
FIG. 23 is a bottom view similar to FIG. 18 in a sixth stage.

When the insertion of the first card 11 further proceeds, a sixth stage illustrated in FIG. 23 is reached. In the sixth stage, the second eject bar 4 slides to a final position of its stroke. The tapered portion 11e further slides along the inclined guide surface 2b3.

Figure 24:
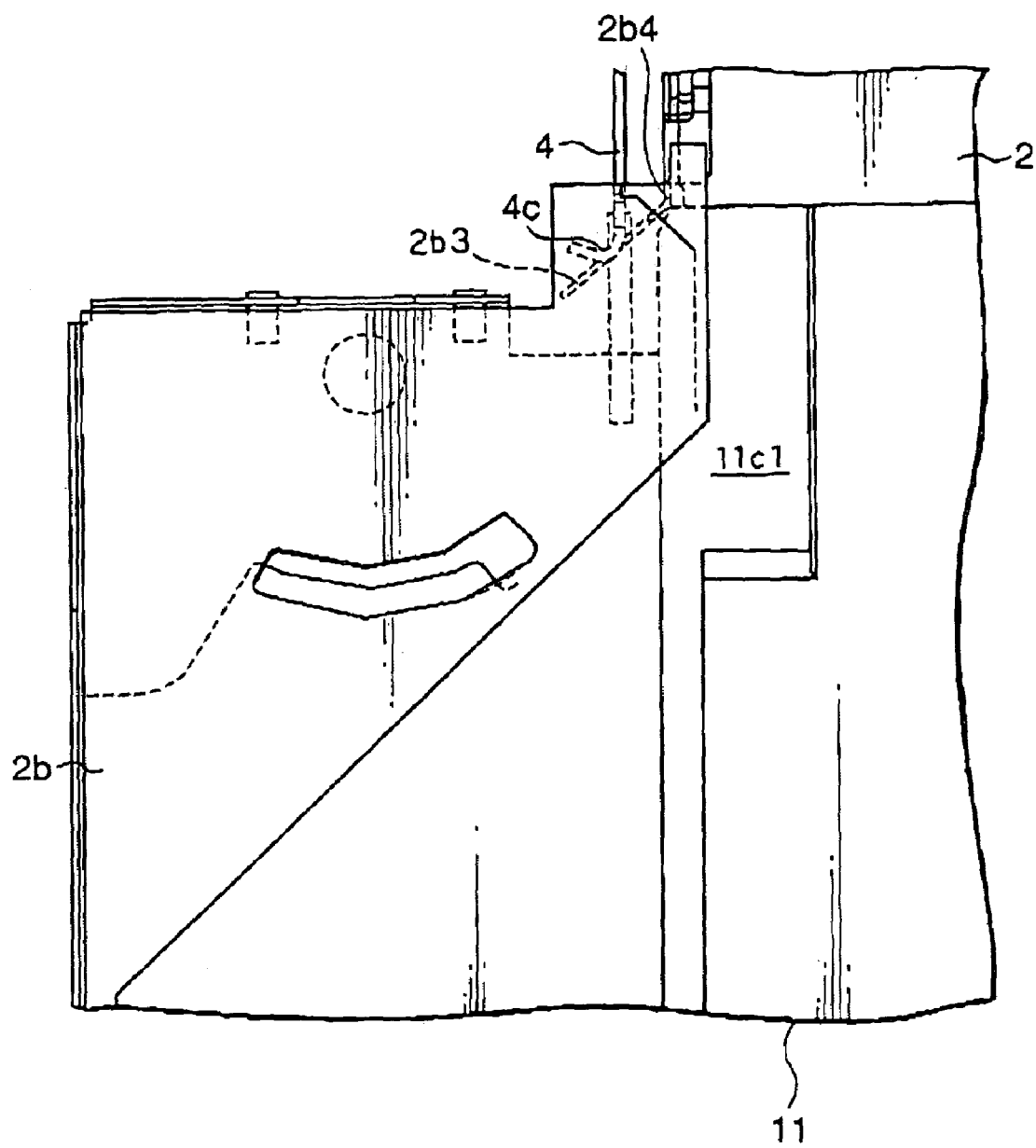
FIG. 24 is a bottom view similar to FIG. 18 in a seventh stage.

When the insertion of the first card 11 further proceeds, a seventh stage illustrated in FIG. 24 is reached. In the seventh stage, the tapered portion 11e at a left corner of the groove 11c1 on the left side of the bottom surface of the first card 11 is started to be guided by the parallel guide surface 2b4 of the guide space 2b of the housing 2.

Figure 25:
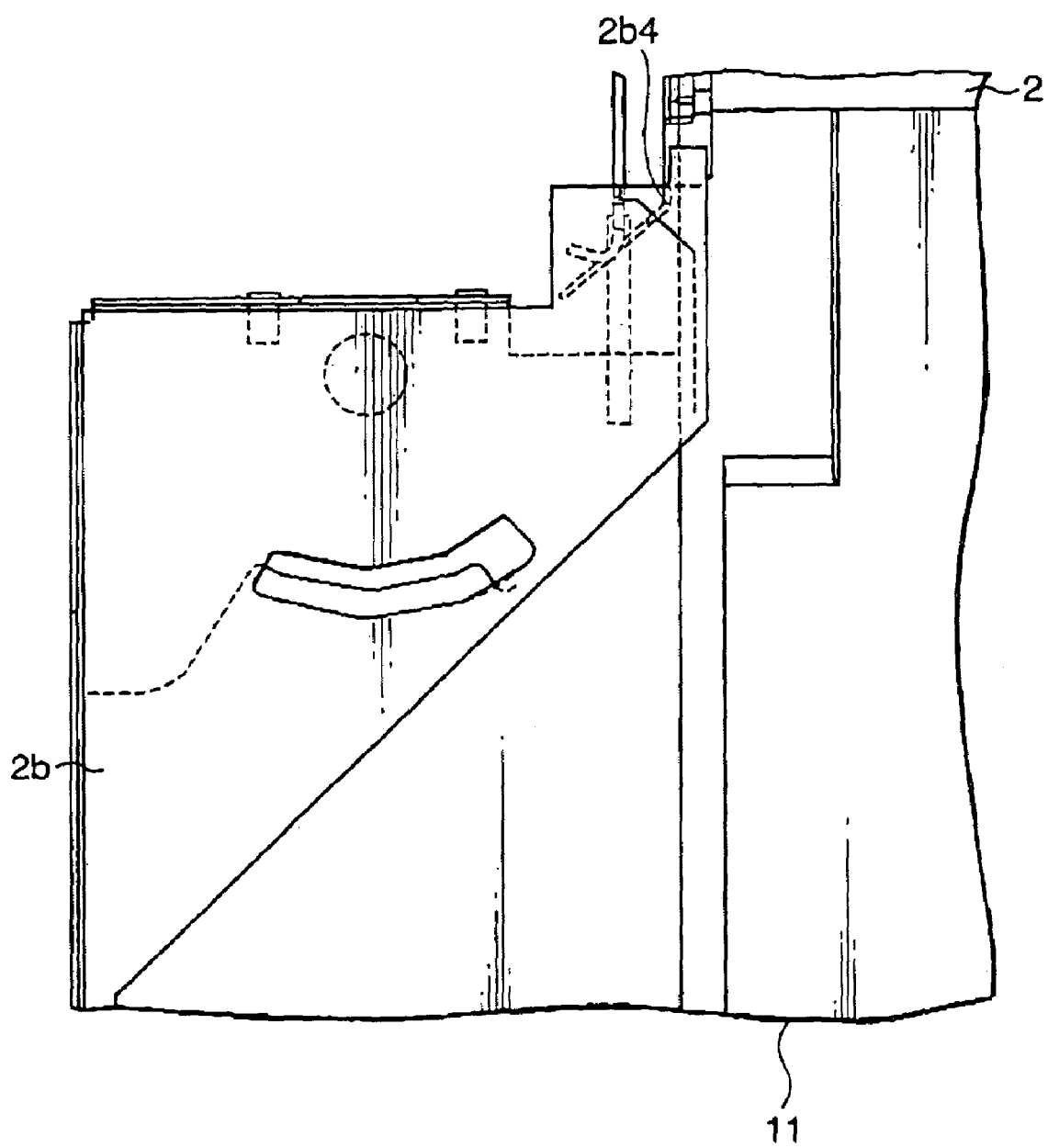
FIG. 25 is a bottom view similar to FIG. 18 in an eighth stage.

When the insertion of the first card 11 further proceeds, an eighth stage illustrated in FIG. 25 is reached. In the eighth stage, the left side surface of the groove 11c1 on the left side of the bottom surface of the first card 11 is guided by the parallel guide surface 2b4 of the guide space 2b of the housing 2.

In case where the first card 11 is inserted into a left half of the housing 2 from the outset, the front end 11a of the first card 11 pushes the eject portion 4b of the second eject bar 4 without contacting the inclined guide surface 2b1 of the housing 2. Therefore, the second eject bar 4 slides in the first direction A1 in FIG. 1A. The rotary lever 5 is rotated clockwise around the shaft 2g. The first eject bar 3 slides in the opposite direction A1' opposite to the first direction A1.

While the present invention has thus far been described in connection with the preferred embodiment thereof, it will readily be possible for those skilled in the art to put this invention into practice in various other manners. For example, although the description is made about a case where express cards are selectively used one at a time, the other cards can be used in place of the express cards.

What is claimed is:

1. A connector adapted to be selectively connected to two types of cards inserted towards an insertion direction and different from each other in width thereof, the connector comprising:

a housing defining a cutout portion and a guide space and having a guide portion for guiding an insertion of a selected one of the cards, the cutout portion being positioned at an end corner portion of the housing in the insertion direction, the guide space being placed short of and adjacent to the cutout portion in the insertion direction, the guide portion extending in the guide space in a particular direction intersecting the insertion direction; and an eject mechanism for moving the selected one towards a removing direction opposite to the first direction, the eject mechanism comprising:

an eject member to be engaged with the selected one and moved together with the selected one;

an operating member for moving the eject member towards the removing direction; and a rotary member placed at the guide space and having a rotation center and rotatable around the rotation center to transmit operation of the operating member to the eject member, the rotation center being disposed in the guide space.

2. The connector according to claim 1, wherein the rotation member is a lever-like member, the eject member including an eject lever having an end portion engaged with an end of the rotary member, the eject lever having a contact portion in the vicinity of the end portion of the eject lever, the contact portion being adapted to be brought into contact with an end of the selected one when the selected one is inserted in the guide space and guided by the guide portion to be placed at a predetermined fitting position.

3. The connector according to claim 2, wherein the eject lever further has an extended portion extended from the contact portion to have an end displaced from the contact portion towards the insertion direction.

4. A connector adapted to be selectively connected to two types of cards inserted towards an insertion direction and different from each other in width thereof, the connector comprising:
- a housing defining a guide space and having a guide portion for guiding an insertion of a selected one of the cards, the guide portion extending in the guide space in a particular direction intersecting the insertion direction; and
- an eject mechanism for moving the selected one towards a removing direction opposite to the first direction,
- the eject mechanism comprising:
- an eject member to be engaged with the selected one and moved together with the selected one;
- an operating member for moving the eject member towards the removing direction; and
- a rotary member having a rotation center and rotatable around the rotation center to transmit operation of the operating member to the eject member, the rotation center being disposed in the guide space,
- wherein the guide portion guides a narrower one of the cards, the guide portion being not engaged with a wider one of the cards.

5. The connector according to claim 4, wherein the guide portion has an inclined surface for moving the narrower one in the particular direction following the movement towards the insertion direction.

6. The connector according to claim 5, wherein the inclined surface has two inclined guide surfaces spaced from each other in the insertion direction and inclined with respect to the insertion direction.

7. The connector according to claim 6, wherein the guide portion has a parallel guide surface formed between the two inclined guide surfaces and parallel to the insertion direction.

8. The connector according to claim 6, wherein the two inclined guide surfaces are engaged with different guided portions of the narrower one different from each other following the movement of the narrower one towards the insertion direction.

9. The connector according to claim 8, wherein the guided portions are spaced from each other in the particular direction.

10. The connector according to claim 1, further comprising another eject member disposed between the rotary member and the operating portion.

11. The connector according to claim 1, further comprising a spur gear and two racks which are disposed between the eject member and the operating member.

* * * * *